(12) United States Patent
Iwashita et al.

(10) Patent No.: US 10,773,171 B2
(45) Date of Patent: Sep. 15, 2020

(54) MATCHING METHOD, MATCHING APPARATUS, AND RECORDING MEDIUM

(71) Applicants: FUJITSU LIMITED, Kawasaki-shi, Kanagawa (JP); KYUSHU UNIVERSITY, NATIONAL UNIVERSITY CORPORATION, Fukuoka-shi, Fukuoka (JP)

(72) Inventors: Hiroaki Iwashita, Tama (JP); Kotaro Ohori, Sumida (JP); Naoyuki Kamiyama, Fukuoka (JP); Akifumi Kira, Fukuoka (JP)

(73) Assignees: FUJITSU LIMITED, Kawasaki (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 170 days.

(21) Appl. No.: 15/897,841

(22) Filed: Feb. 15, 2018

(65) Prior Publication Data
US 2018/0236358 A1 Aug. 23, 2018

(30) Foreign Application Priority Data

Feb. 17, 2017 (JP) .................................. 2017-028361
Sep. 29, 2017 (JP) .................................. 2017-192160

(51) Int. Cl.
*A63F 13/795* (2014.01)
*G07F 17/32* (2006.01)
*G06Q 30/06* (2012.01)

(52) U.S. Cl.
CPC ............ *A63F 13/795* (2014.09); *G07F 17/32* (2013.01); *G06Q 30/0631* (2013.01)

(58) Field of Classification Search
CPC .... A63F 13/795; G07F 17/32; G07F 17/3232; G07F 17/3227; G07F 17/3272; G06Q 30/0631
See application file for complete search history.

(56) References Cited

PUBLICATIONS

Svensson, "Strategy-proof allocation of indivisible goods," Social Choice and Welfare 16.4, 1999, pp. 557-567.

*Primary Examiner* — Kevin Y Kim
(74) *Attorney, Agent, or Firm* — Staas & Halsey LLP

(57) ABSTRACT

A non-transitory computer-readable recording medium stores therein a matching program that causes a computer to execute a process including: determining subgame perfect equilibrium of a game in extensive form corresponding to the matching, the game in extensive form having a structure in which a plurality of independent players have respective gains corresponding to respective preferences of the respective applicants, and have the ranks of priority associated with order of play, and each of the players recognizes the gains of all the players; performing matching based on results of the subgame perfect equilibrium; setting the gain of a player corresponding to a coupling-requesting applicant having a coupling request requesting matching as a group with another specific applicant, in accordance with whether the coupling request is satisfied; and determining whether to prune options in a move of the player corresponding to the coupling-requesting applicant.

18 Claims, 21 Drawing Sheets

FIG.2

| DAY NURSERY ID | NUMBER OF ACCEPTABLE CHILDREN | |
|---|---|---|
| | CLASS OF AGE 0 | CLASS OF AGE 1 |
| s | 1 | 1 |
| t | 1 | 1 |
| u | 1 | 1 |
| ⋮ | ⋮ | ⋮ |

11

| APPLICATION ID | PREFERENCE LIST | CHILD ID | AGE | RANK OF PRIORITY |
|---|---|---|---|---|
| A | s→t→u | a1 | AGE 1 | 1 |
| | | a0 | AGE 0 | 5 |
| B | s→t→u | b1 | AGE 1 | 2 |
| | | b0 | AGE 0 | 4 |
| C | s | c0 | AGE 0 | 3 |
| D | s→t→u | d1 | AGE 1 | 6 |
| ⋮ | ⋮ | ⋮ | ⋮ | ⋮ |

| CHILD ID | DAY NURSERY ID (14) |
|---|---|
| a1 | t |
| a0 | t |
| b1 | u |
| b0 | u |
| c0 | s |
| d1 | s |
| ⋮ | ⋮ |

| DAY NURSERY ID | NUMBER OF ACCEPTABLE CHILDREN ||
|---|---|---|
| | CLASS OF AGE 0 | CLASS OF AGE 1 |
| s | 1 | 1 |
| t | 1 | 1 |
| u | 1 | 1 |
| ⋮ | ⋮ | ⋮ |

11

| APPLICA-TION ID | PREFER-ENCE LIST | CHILD ID | AGE | RANK OF PRIORITY |
|---|---|---|---|---|
| A | s→t→u | a1 | AGE 1 | 1 |
| | | a0 | AGE 0 | 5 |
| B | s→t→u | b1 | AGE 1 | 2 |
| | | b0 | AGE 0 | 4 |
| C | s | c0 | AGE 0 | 3 |
| D | s→t→u | d1 | AGE 1 | 6 |
| ⋮ | ⋮ | ⋮ | ⋮ | ⋮ |

12

(a1, a0, b1, b0)

| PLAYER'S STRAT-EGY | SIBLING'S STRATEGY ||||
|---|---|---|---|---|
| | s | t | u | N/A |
| s | ⓖ | 3 | 3 | 3 |
| t | 2 | ⑤ | 2 | 2 |
| u | 1 | 1 | ④ | 1 |
| N/A | 0 | 0 | 0 | 0 |

15A (c0)

| PLAYER'S STRAT-EGY | |
|---|---|
| s | 3 |
| N/A | 0 |

15B (d1)

| PLAYER'S STRAT-EGY | |
|---|---|
| s | 3 |
| t | 2 |
| u | 1 |
| N/A | 0 |

15C

MATCHING METHOD, MATCHING APPARATUS, AND RECORDING MEDIUM

CROSS-REFERENCE TO RELATED APPLICATION

This application is based upon and claims the benefit of priority of the prior Japanese Patent Application No. 2017-028361, filed on Feb. 17, 2017 and Japanese Patent Application No. 2017-192160, filed on Sep. 29, 2017, the entire contents of which are incorporated herein by reference.

FIELD

The embodiments discussed herein are related to a matching program, a matching method, and a matching apparatus.

BACKGROUND

In related art, a Serial Dictatorship mechanism (hereinafter referred to as "SD mechanism") is known, as matching processing to assign a number of applicants (such as children of guardians who desire childcare) to application targets (such as nursery schools) (Svensson, Lars-Gunnar, "Strategy-proof allocation of indivisible goods," Social Choice and Welfare 16.4 (1999): 557-567.). In the SD mechanism, ranks of priority are assigned to the applicants, and the applicants are allocated to the application targets that the applicants desire, among the application targets that are left at the point in time, in order from the applicant with the highest rank of priority. The SD mechanism guarantees that the ranks of priority are not reversed.

However, the related art described above has the problem that proper assignment to the application target is difficult in the case where the applicants include applicants who request coupling.

For example, in application to a plurality of day nurseries, there are cases where the guardian requests coupling of one's children being siblings (such as brothers, an elder brother and a younger sister, an elder sister and a younger brother, and sisters). Because the SD mechanism is not a mechanism made in consideration of applicants who request coupling of siblings, the SD mechanism may fail to obtain proper matching results (allocation), when the applicants include applicants who request coupling of siblings. For example, one of the following problems 1 to 3 may occur in matching.

Problem 1: Another applicant with a rank of priority lower than the applicant oneself enters the day nursery that the applicant oneself desires to enter (regardless of existence of siblings).

Problem 2: As siblings, applicants (they are not always siblings), both of whom have ranks of priority lower than that of the applicant oneself, enter the day nursery that the applicant oneself desires to enter.

Problem 3: The siblings enter separate day nurseries, although allocation to cause siblings to enter the same day nursery with a low desired order is better than allocation to cause siblings to enter separate day nurseries in accordance with their individual ranks of priority.

FIG. 19 to FIG. 21 are explanatory drawings illustrating the first to the third cases. In the examples of FIG. 19 to FIG. 21, the applicants $202a$ are matched with the application targets $201a$, based on the same application target information 201 and applicant information 202.

The application target information 201 is information for the application targets $201a$ (day nurseries in the illustrated example), in which the numbers of acceptable children and the like in the application targets $201a$ are preset. In the illustrated example, the number of acceptable children is set to two in each of day nurseries "S1" to "S3".

The applicant information 202 is information set for the applicants $202a$ (children in the illustrated example) in advance for applications of the respective guardians. Specifically, the applicant information 202 has a structure in which, in each of application IDs indicating applications, the points to determine the rank of priority and the order of desired nurseries indicating the ranking of the desired application targets $201a$, for each of child IDs identifying the applicant children. For example, the ranks of priority are assigned to the applicants $202a$ in the order of their points, highest first, in the applicant information 202. When one application ID includes a plurality of child IDs, the child IDs indicate children who have a sibling relation, and the application ID includes a coupling request between the children.

As illustrated in FIG. 19, in the first case C1, the sibling relations (coupling requests) are ignored, and the applicants $202a$ are assigned to the application targets $201a$ by the SD mechanism, based on the application target information 201 and the applicant information 202. Specifically, the applicants $202a$ are assigned to their desired application targets $201a$ (S201 to S206), in order from the applicant $202a$ with the highest rank of priority (the order of I1, J1, K1, K2, L1, and I2 in the illustrated example).

As described above, the problem 3 occurs in the first case C1 in which assignment is performed by the SD mechanism, with the coupling requests ignored. Specifically, the siblings of K1 and K2 are not admitted to the same day nursery, even to a day nursery (such as S2) with a low desired rank, but admitted to separate day nurseries.

As illustrated in FIG. 20, in the second case C2, assignment is performed in the form in which the children with a sibling relation (coupling request) are put together (S211 to S214). In the second case C2, when the children with a sibling relation are put together, the points of the coupled children are set to the higher point of the two.

As illustrated in FIG. 21, also in the third case C3, assignment is performed in the form in which the children with a sibling relation (coupling request) are put together (S221 to S224). In the third case C3, when the children with a sibling relation are put together, the points of the coupled children are set to the lower point of the two.

As described above, in the second case C2 and the third case C3 in which assignment is performed in the form in which the applicants are put together in accordance with coupling requests, the problem 1 occurs because the individual ranks of priority are distorted. Specifically, in the second case C2, the applicant $202a$ of I2 having the rank of priority lower than that of L1 is assigned to the desired application target $201a$ (S1 in the illustrated example), and the ranks of priority are reversed. In addition, in the third case C3, the applicants $202a$ of K1 and K2 having the ranks of priority lower than that of I1 are assigned to the desired application target $201a$ (S1 in the illustrated example), and the ranks of priority are reversed.

As described above, when the applicants are assigned by the SD mechanism with the sibling relations (coupling requests) ignored, the problem 3 frequently occurs. In addition, when the applicants are assigned in the form in which siblings are put together (in accordance with coupling requests), the problem 1 frequently occurs.

When matching in the form in which children having sibling relations are put together is searched for to minimize these problems, obtaining stable matching becomes difficult in the case where preconditions in matching changes, such as the number of children to be admitted is determined for each of classes divided by age. In addition, such a case requires a large quantity of calculation.

SUMMARY

According to an aspect of the embodiment, a non-transitory computer-readable recording medium stores therein a matching program that causes a computer to execute a process including: determining subgame perfect equilibrium of a game in extensive form corresponding to the matching, the game in extensive form having a structure in which a plurality of independent players have respective gains corresponding to respective preferences of the respective applicants, and have the ranks of priority associated with order of play, and each of the players recognizes the gains of all the players; performing matching based on results of the subgame perfect equilibrium; setting the gain of a player corresponding to a coupling-requesting applicant having a coupling request requesting matching as a group with another specific applicant, in accordance with whether the coupling request is satisfied; and determining whether to prune options in a move of the player corresponding to the coupling-requesting applicant, with respect to options of a game tree corresponding to a subgame of the game in extensive form, with reference to details of the coupling request of the coupling-requesting applicant.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory drawing illustrating application target information and applicant information;

FIG. 3 is an explanatory drawing illustrating result data;

DESCRIPTION OF EMBODIMENTS

Figure 1:
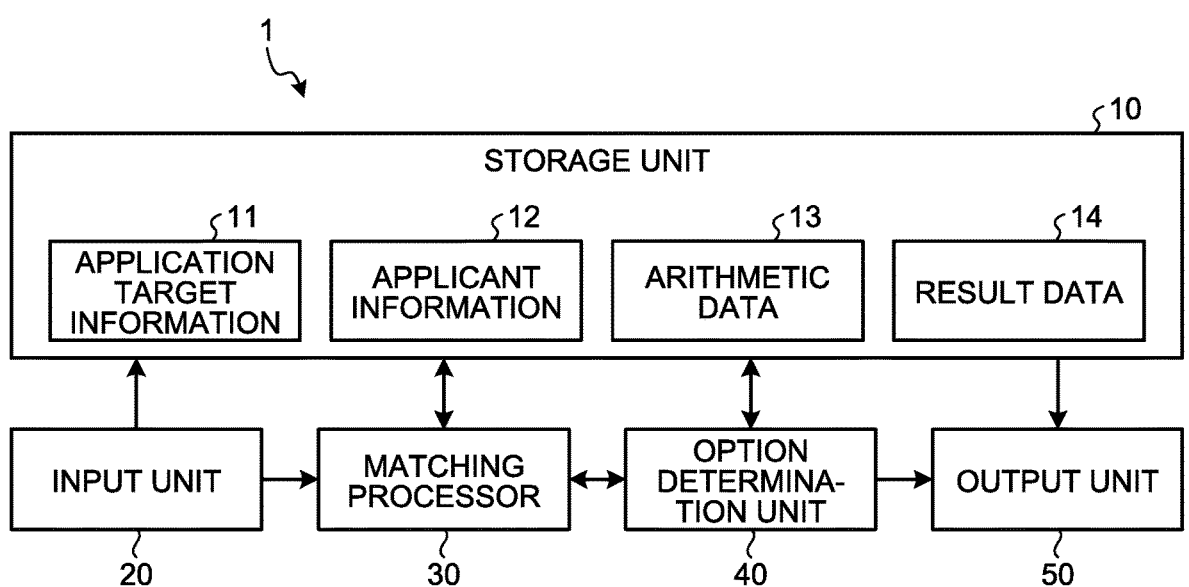
FIG. 1 is a block diagram illustrating a functional configuration example of a matching apparatus according to embodiments.

Preferred embodiments will be explained with reference to accompanying drawings. In the embodiments, constituent elements having the same function are denoted with the same reference numeral, and an overlapping explanation is omitted. The matching programs, the matching methods, and the matching apparatuses explained in the following embodiments merely illustrate examples, and do not limit the embodiments. The following embodiments may be properly combined within a range that does not cause contradiction.

FIG. 1 is a block diagram illustrating a functional configuration example of a matching apparatus according to embodiments. The matching apparatus 1 illustrated in FIG. 1 is an information processing apparatus, such as a personal computer (PC). The matching apparatus 1 performs matching processing between a plurality of applicants provided with respective ranks of priority and a plurality of application targets, based on input information, and outputs calculated matching results. Based on the matching results, the user assigns the applicants to the application targets.

The present embodiment illustrates the case where the application targets are day nurseries and the applicants are children of guardians who desire childcare in day nurseries; however, the application targets and the applicants are not limited to the examples illustrated in the embodiments. For example, the applicants may be guests at a hotel, the application targets may be rooms in the hotel, and the matching apparatus may be applied to allocation of the guests to the rooms at the hotel.

As illustrated in FIG. 1, the matching apparatus 1 includes a storage unit 10, an input unit 20, a matching processor 30, an option determination unit 40, and an output unit 50.

The storage unit 10 stores various types of information in a storage device, such as a random access memory (RAM) and a hard disk drive (HDD). Specifically, the storage unit 10 stores input information therein, such as application target information 11 and applicant information 12 input from the input unit 20, arithmetic data 13 in arithmetic operation performed with the matching processor 30 and the option determination unit 40, and result data 14 indicating matching results calculated with the matching processor 30.

The application target information 11 is information for the application targets input and preset with the input unit 20. The applicant information 12 is information for applicants input and preset with the input unit 20.

FIG. 2 is an explanatory drawing illustrating the application target information 11 and the applicant information 12. As illustrated in FIG. 2, the application target information 11 includes the numbers of acceptable children set for respective day nurseries (application targets) identified with day nursery IDs. In each of the day nurseries, the number of acceptable children is set for each of classes divided by age (class for age 0, and class for age 1).

In the applicant information 12, a preference list indicating the ranking of the desired day nurseries, the age of the child, and the rank of priority for assignment are set for each of children (applicants) identified with the respective child IDs.

In the applicant information 12, when a plurality of child IDs are included in the same application ID, the children have, for example, a sibling (brothers, an elder brother and a younger sister, an elder sister and a younger brother, or sisters) relation, and a coupling request exists between the children. The coupling request requests assignment (matching) of the children as a group to the application target (day nursery).

For example, each of pairs of a1 and a0, and b1 and b0, serves as applicants having a sibling relation, and requesting a mutual coupling (coupling-requesting applicants). For each of pairs of a1 and a0, and b1 and b0, the guardian, serving as a person who made the application, requests assignment (matching) of the children, as a group, to the application target (day nursery).

With reference to FIG. 1 again, the arithmetic data 13 is data in arithmetic operation of matching processing performed with the matching processor 30 and the option determination unit 40 to match a plurality of applicants with a plurality of application targets. For example, the arithmetic data 13 includes gain tables and data related to search of a game tree (details thereof will be described later).

The result data 14 is data calculated by matching processing with the matching processor 30 and the option determination unit 40 and indicating results of assignment of the applicants (children) to the application targets (day nurseries).

FIG. 3 is an explanatory drawing illustrating the result data 14. As illustrated in FIG. 3, the result data 14 associates the child IDs indicating children with the day nursery IDs indicating the day nurseries to which the children are assigned.

With reference to FIG. 1 again, the input unit 20 receives input information relating to matching processing, such as the application target information 11 and the applicant information 12, through an input device, such as a mouse and a keyboard. The input unit 20 stores the received application target information 11 and applicant information 12 in the storage unit 10.

The matching processor 30 performs matching processing to match a plurality of applicants provided with respective ranks of priority with a plurality of application targets, based on the application target information 11 and the applicant information 12. In the matching processing, the matching processor 30 virtualizes a game in extensive form corresponding to matching between a plurality of applicants and a plurality of application targets. The matching processor 30 determines subgame perfect equilibrium of the game in extensive form recognizing gains of all the players, and performs matching based on results of the subgame perfect equilibrium.

The game in extensive form is one of expression forms of games in the game theory. In the game in extensive form, a series of moves of the players are expressed with a tree structure called "game tree". The game tree is expressed with nodes, branches, and leaves (nodes). Each of the nodes indicates the move (phase of the game) of the player. Each of the branches indicates an option (strategy) of the player. Each of the leaves indicates the end phase of the game. The gains of the players are provided by selections of the players to the phase end from the top node to the leaf through the branches.

A subgame is the whole or part of the original game in extensive form, and the subgame itself also serves as a game in extensive form. The subgame perfect equilibrium is a situation in which options that produce Nash equilibrium (each of the players selects the best strategy against strategies of the other players) in all the subgames are selected.

The matching processor 30 sets a plurality of applicants (children) in the applicant information 12 as a plurality of independent players having respective gains corresponding to their preferences, and virtualizes a perfect information game in which the players play (select a day nursery) once in turn. The perfect information game is a game in extensive form in which the players are provided with the state up to the node and all the options at all the nodes. Specifically, all the players recognize all pieces of information (the ranks of priority, the ages, the sibling relations (presence/absence of the coupling request), and preference lists of the players, and the numbers of acceptable children for the day nurseries/classes of age) relating to the game (assignment).

First, the matching processor 30 sets gain tables corresponding to strategies for the respective players (children) corresponding to the applicants, based on the applicant information 12. The gain tables are set, in accordance with the preference lists in the applicant information 12, and presence/absence of the coupling request.

Specifically, a higher gain is set for the strategy (option) of each of the players, as the rank of the option in the preference list becomes higher. In addition, for coupling-requesting applicants having a coupling request requesting matching as a group, a higher gain is set when the coupling request is satisfied.

Figure 4:
FIG. 4 is an explanatory drawing illustrating gain tables.

FIG. 4 is an explanatory drawing illustrating the gain tables. As illustrated in FIG. 4, for the applicants (c0 and d1) with no coupling request, gain tables 15B and 15C are set, respectively, in which a higher gain is set for a strategy with a higher rank in the preference list. The mark "N/A" indicates a case where no day nursery in the preference list could be reserved.

A gain table 15A is set for the coupling-requesting applicants (a1, a0, b1, and b0). In the gain table 15A, a higher gain is set for a strategy, in order according to the following cases 1 to 3.

1. The case where the siblings select the same day nursery (in addition, the gain for the selected day nursery increases according to the ranking of the preference list)
2. The case where the siblings select different day nurseries (in addition, the gain for the selected day nursery increases according to the ranking of the preference list)
3. The case where no day nursery in the preference list could be reserved For example, in the case where the siblings select the same day nursery, the gain values are set to "6", "5", and "4", in accordance with the order of the preference list (s→t→u). In the case where the siblings select different day nurseries, the gain values are set to "3", "2", and "1", in accordance with the order of the preference list (s→t→u). In the case where no day nursery in the preference list could be reserved (N/A), the gain value is set to "0".

Thereafter, the matching processor 30 performs plays (selection of the option) of the players in the same order (the order of a1, b1, c0, b0, a0, and d1 in the example of FIG. 4) as the rank of priority of the children, highest first. The strategy of each of the players is selecting a day nursery, the number of children to be admitted to which has not reached the prescribed number (the number of selections by the players with the higher ranks has not reached the number of acceptable children), from the day nurseries in one's preference list, among the day nurseries in the application target information 11. However, when all the desired day nurseries (all the day nurseries included in the player's preference list) have reached their prescribed numbers of acceptable children, the player does nothing.

In the processing, the matching processor 30 selects an option having the highest gain and producing Nash equilibrium, in the play of each of the players, based on the gain tables 15A to 15C. In this manner, the matching processor 30 searches for a path (hereinafter referred to as "equilibrium path") serving as the first path to a leaf (end phase) along the tree structure of the game tree and producing Nash equilibrium, that is, determines subgame perfect equilibrium.

Figure 5:
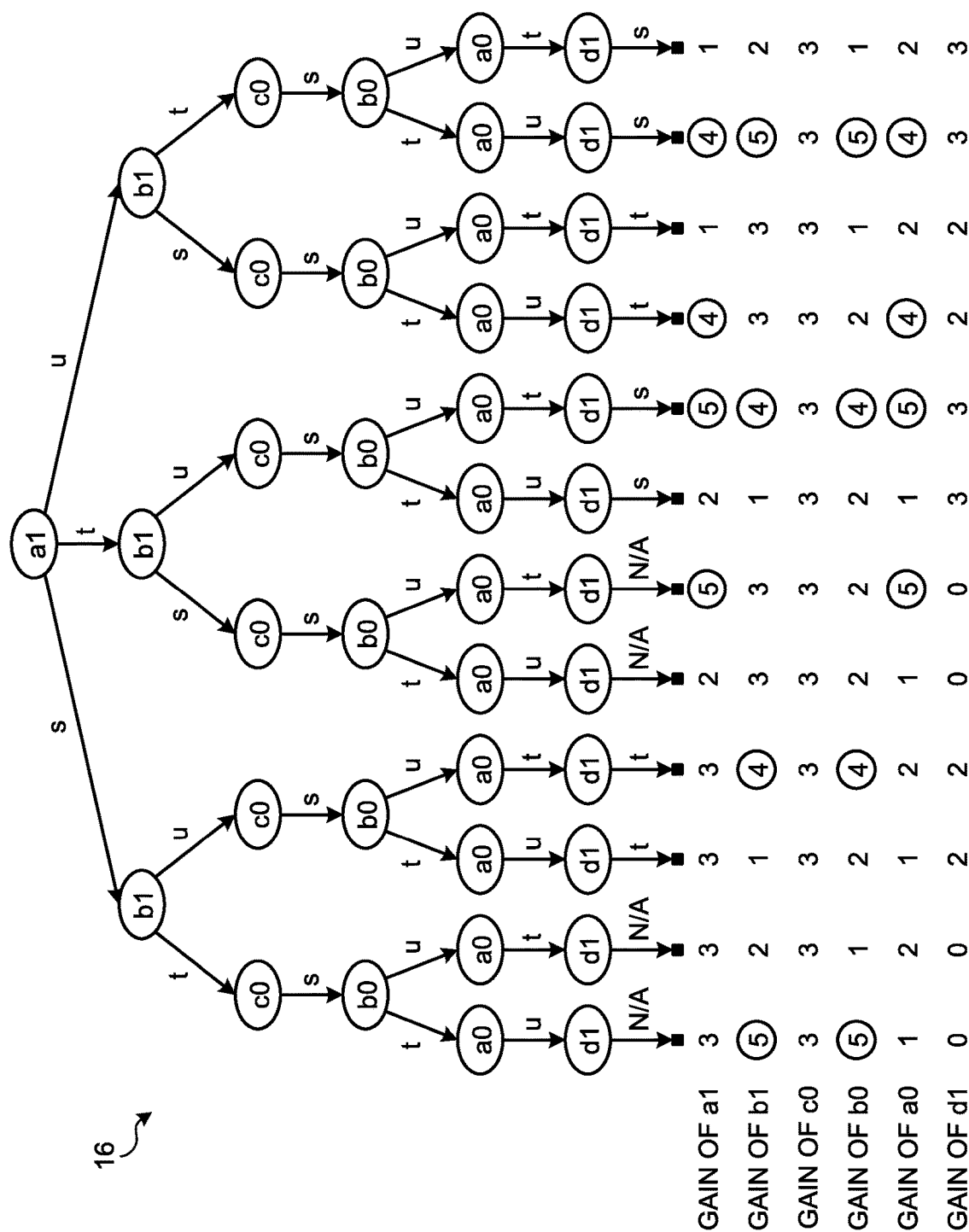
FIG. 5 is an explanatory drawing illustrating a game tree.

FIG. 5 is an explanatory drawing illustrating a game tree. As illustrated in FIG. 5, a game tree 16 has a tree structure in which phases of the players (a1, b1, c0, b0, a0, and d1) serve as nodes, and options (s, t, u) of the players serve as branches, in the same order as the rank of priority of the children, highest first. Specifically, the game tree 16 is a game tree corresponding to a subgame of a game in extensive form corresponding to matching between a plurality of applicants (a1, b1, c0, b0, a0, and d1) and a plurality of application targets (s, t, u).

Figure 6:
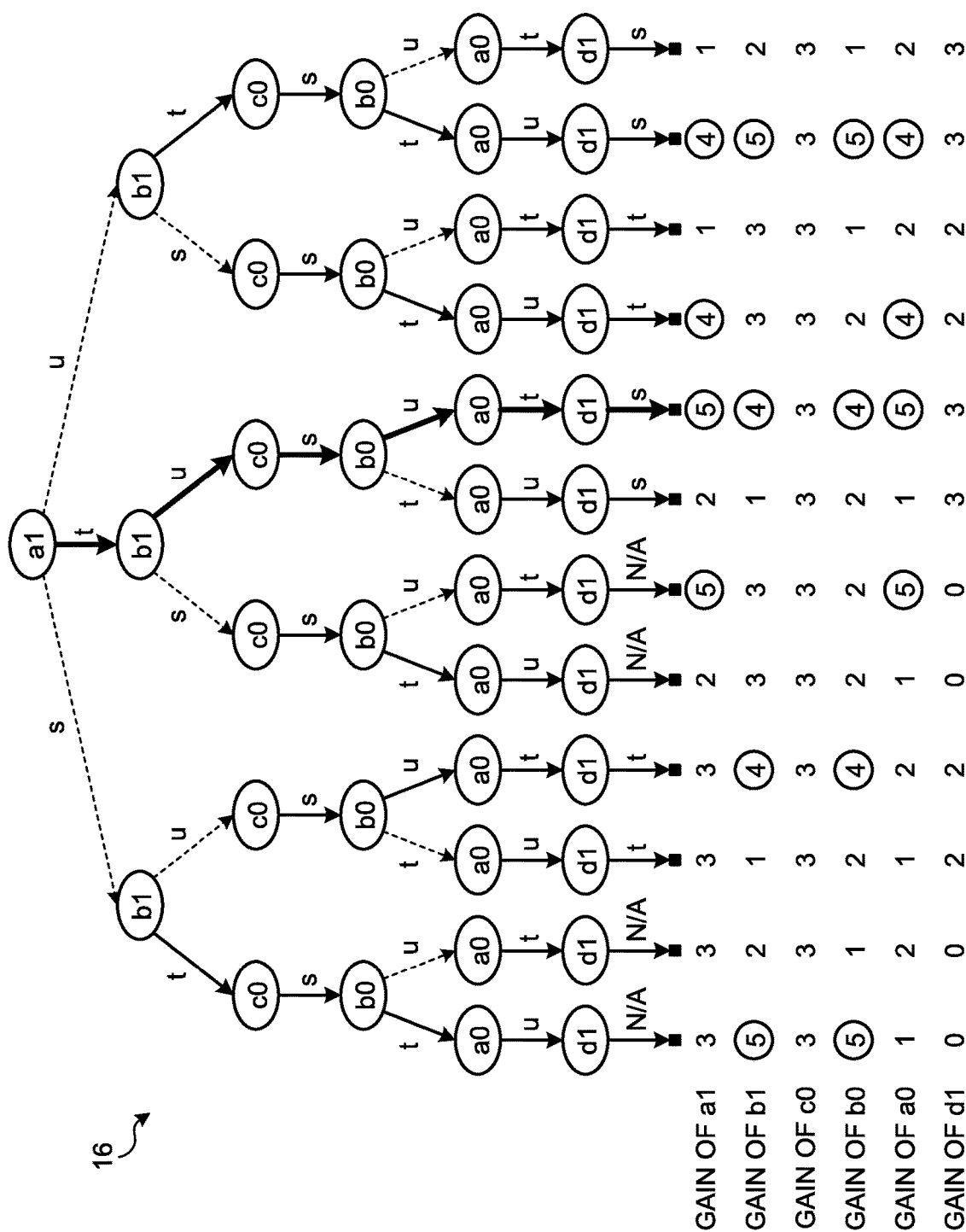
FIG. 6 is an explanatory drawing illustrating subgame perfect equilibrium.

FIG. 6 is an explanatory drawing illustrating subgame perfect equilibrium. As illustrated in FIG. 6, the matching processor 30 plays the game successively from the top node (a1) in the game tree 16, to search for an equilibrium path (bold line) producing Nash equilibrium in the paths reaching the leaves (d1), and determine subgame perfect equilibrium.

In the processing, playing in the same order as the rank of priority of the children corresponds to performing assignment of children to day nurseries, from the child with the highest rank of priority in the SD mechanism. In addition, selection with the maximum gain is always performed (which agrees with the operation in the SD mechanism) on each of children without siblings (without coupling request). Selection with the maximum gain is performed for each of children having sibling relations (coupling-requesting applicants), with preference relating to the coupling reflected as the gain values of the game, based on the gain table 15A setting gain values corresponding to presence/absence of satisfaction of the coupling.

As described above, selection to maximize the gain of each of the players contributes to stable matching between a plurality of applicants and a plurality of application targets. In addition, the matching processor 30 searches for an equilibrium path (bold line) producing Nash equilibrium, and determines subgame perfect equilibrium, to obtain results (result data 14) assigning the applicants to the proper application targets in accordance with the preferences (preference lists and presence/absence of coupling) of the applicants.

With reference to FIG. 1 again, the option determination unit 40 determines whether to prune the options in the move of the player corresponding to the coupling-requesting applicant, for options of the game tree of the game in extensive form in matching processing with the matching processor 30, with reference to the details of the coupling request of the coupling-requesting applicant. Specifically, the option determination unit 40 serves as an example of the determination unit.

For example, the player's gain determined in the end for one strategy (option) selected by the coupling-requesting applicant includes two gains according to whether the coupling request is satisfied (for example, the case where the sibling's strategy is the same/different). Accordingly, the cases can be divided according to whether the gain is set to a gain expecting that the coupling request is satisfied also for the other. After dividing the cases, the gain is uniquely determined. Using it, the option determination unit 40 selects an option with a gain with expectation that the other also satisfies the coupling request. When the expected gain is not obtained and the expectation is not satisfied, the option determination unit 40 backtracks, and removes the option failing to satisfy the expectation. As described above, after the gain is uniquely determined, the option determination unit 40 allows pruning of options in the move of the player corresponding to the coupling-requesting applicant.

For example, in the move of the player corresponding to the coupling-requesting applicant, first, the option determination unit 40 determines the option with the maximum gain in options expected to satisfy the coupling request. Thereafter, in the move of a player corresponding to the other coupling-requesting applicant with the lower rank of priority, there are cases in which no options satisfying the coupling request are left, due to the conditions, such as the numbers of acceptable children of the day nurseries.

In such cases, the option selected with expectation of satisfying the coupling request in the move of the player corresponding to the coupling-requesting applicant with the higher rank of priority turns out to fail to meet the expectation. Accordingly, when selection of an option satisfying the coupling request is impossible in the move of a player corresponding to the other coupling-requesting applicant with the lower rank of priority, the option determination unit 40 backtracks to the move of the player corresponding to the coupling-requesting applicant with the higher rank of priority, to remove the option failing to meet the expectation.

As described above, the option determination unit 40 performs pruning of the options in the game tree 16. The pruning reduces the number of paths to be searched, and enables the matching processor 30 to reduce the calculation cost to determine the subgame perfect equilibrium.

Figure 7:
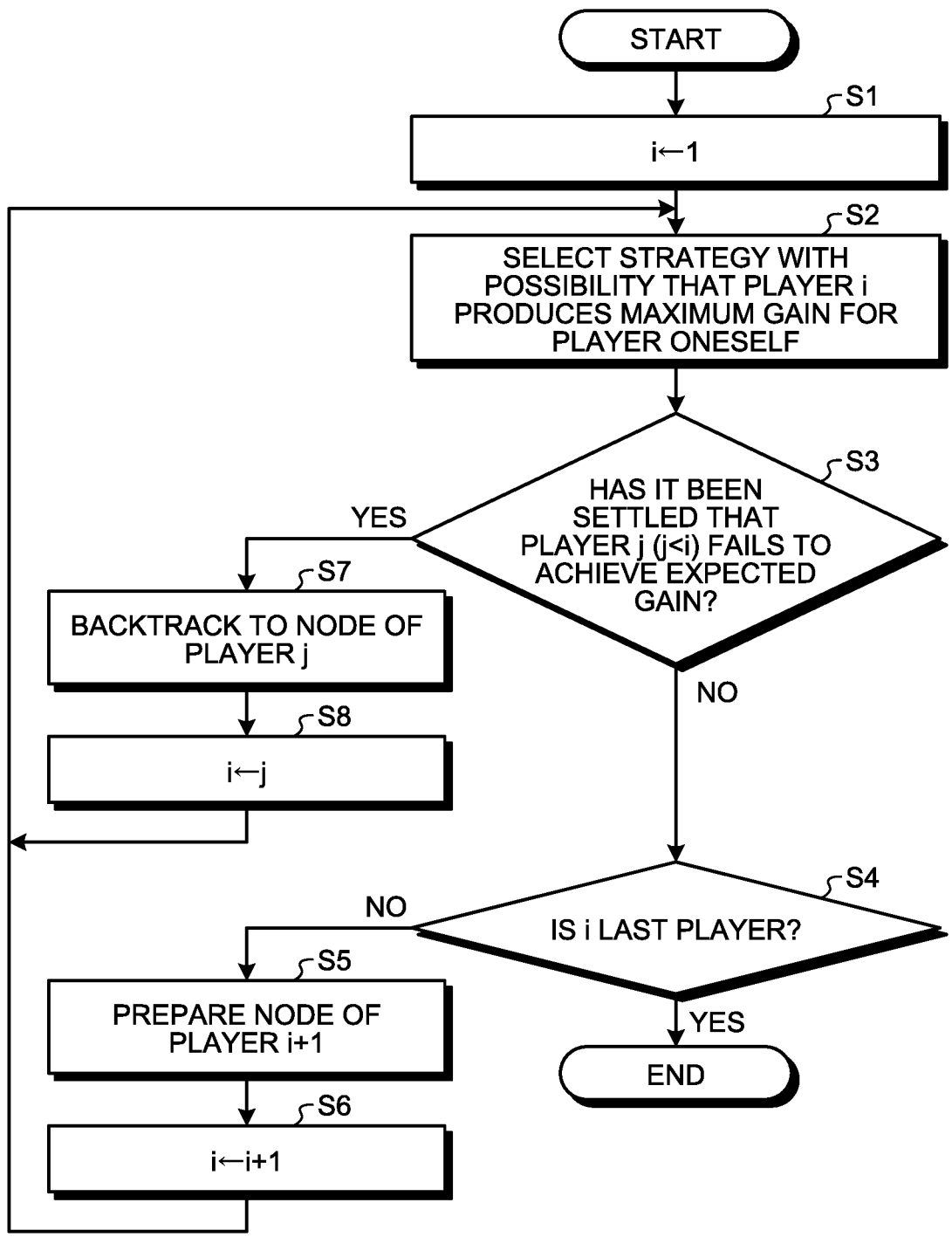
FIG. 7 is a flowchart illustrating an example of matching processing.

The following is an explanation of details of the matching processing with the matching processor 30 and the option determination unit 40. FIG. 7 is a flowchart illustrating an example of the matching processing.

As illustrated in FIG. 7, when the processing is started, the matching processor 30 initializes (i←1) a variable (i) corresponding to the order of players of the matching processing (S1).

Thereafter, the matching processor 30 selects a strategy having possibility that the player i may produce the maximum gain for the player oneself (S2), based on the gain tables 15A to 15C. In the move of the player corresponding to the coupling-requesting applicant, the player selects a strategy with a gain with expectation that the other also satisfies the coupling request.

Thereafter, the option determination unit 40 determines whether it has been settled that the player j (j<i) having the higher rank of priority than that of the player i fails to achieve the expected gain (S3). For example, when no options satisfying the coupling request can be selected in the move of the player i corresponding to the other coupling-requesting applicant having the lower rank of priority, it is settled that the player j corresponding to the coupling-requesting applicant with the higher rank of priority fails to achieve the expected gain.

When it has been settled that the player j fails to achieve the expected gain (YES at S3), the option determination unit 40 performs backtrack to the node of the player j, on the matching processing in the matching processor 30 (S7). Thereafter, the option determination unit 40 changes j to i (S8), after removing the strategy (option) settled to fail to achieve the expected gain, and returns the processing to S2. In this manner, the matching processor 30 selects the strategy, with the strategy failing to meet the expectation removed, from the move of the player having been returned by backtrack in the processing.

When it has not been settled that the player j fails to achieve the expected gain (NO at S3), the matching processor 30 determines whether the player i is the last player (the applicant with the lowest rank of priority) (S4).

When the player i is the last player (YES at S4), because the equilibrium path reaching the leaf (end phase) along the tree structure of the game tree has been found, the matching processor 30 ends the processing.

When the player i is not the last player (NO at S4), the matching processor 30 prepares a node of a player (i+1) corresponding to the applicant with the next rank of priority (S5), changes (i+1) to i (S6), and returns the processing to Step S2.

The following is an explanation of a specific example of the matching processing described above. Suppose that sample data of the specific example illustrated hereinafter are based on the values of the application target information 11 and the applicant information 12 in FIG. 4. Suppose that the game tree and the subgame perfect equilibrium in the sample data are based on FIG. 5 and FIG. 6.

Figure 8:
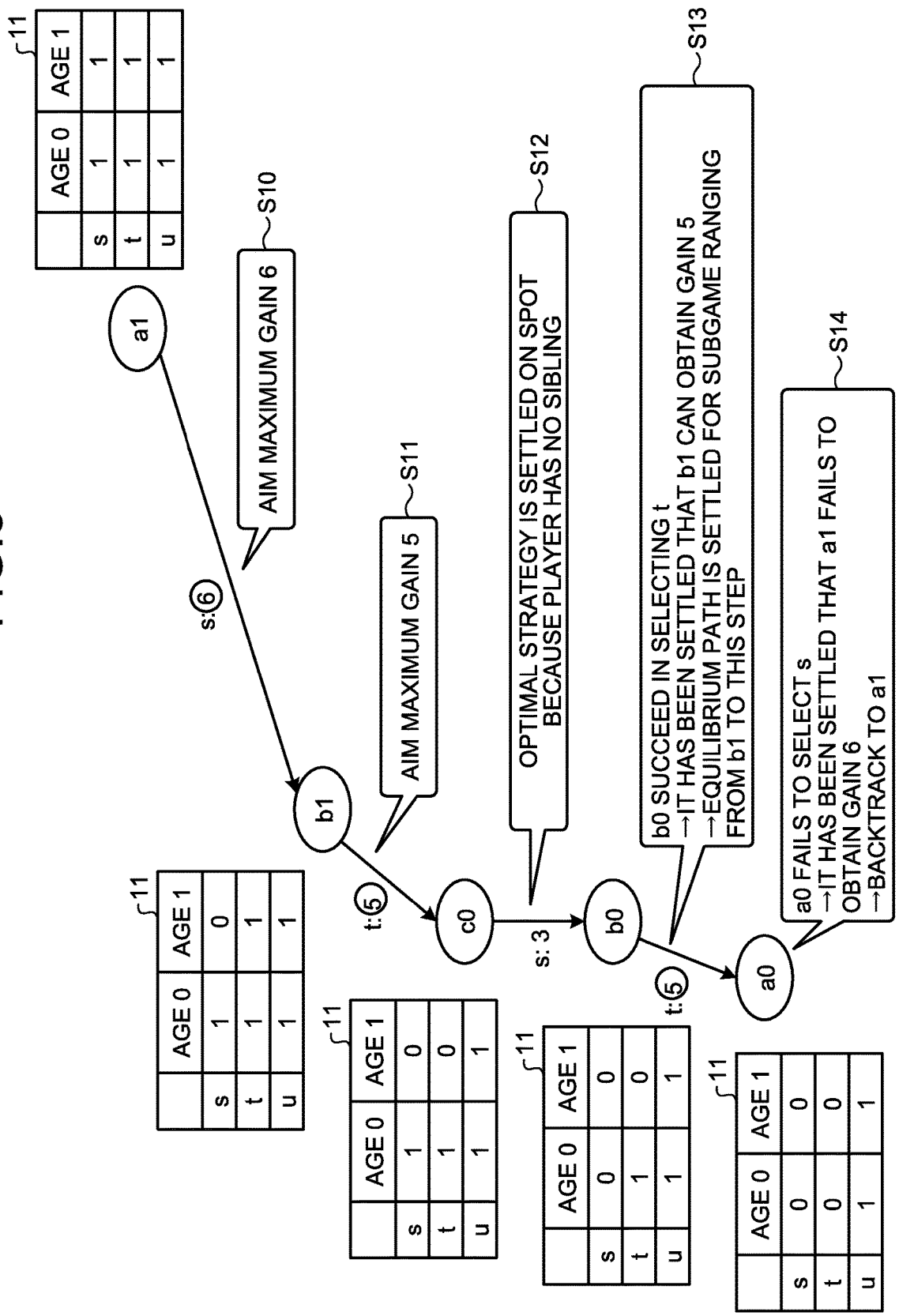
FIG. 8 is an explanatory drawing illustrating a specific example of matching processing.
Figure 9:
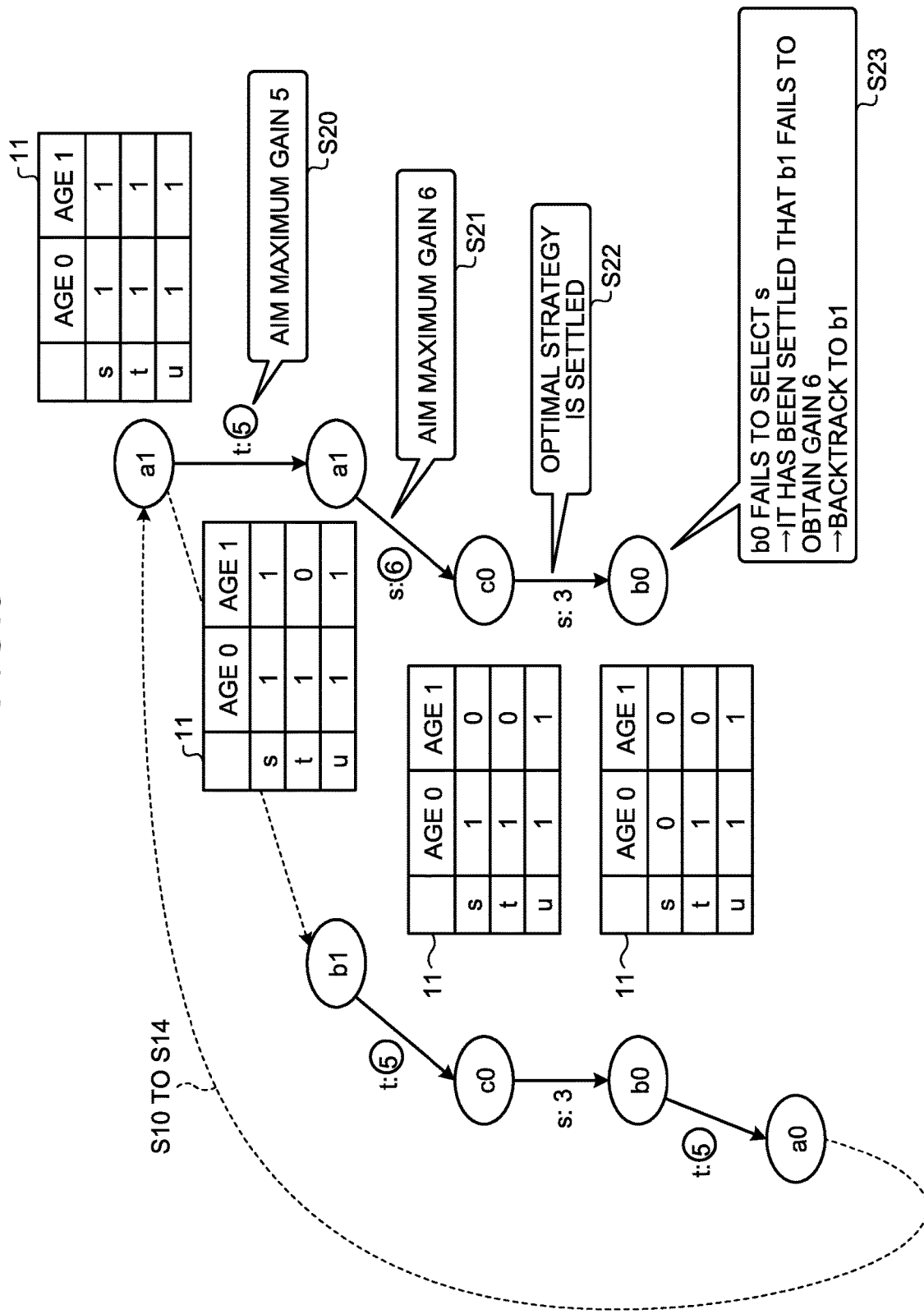
FIG. 9 is an explanatory drawing illustrating the specific example of matching processing.
Figure 10:
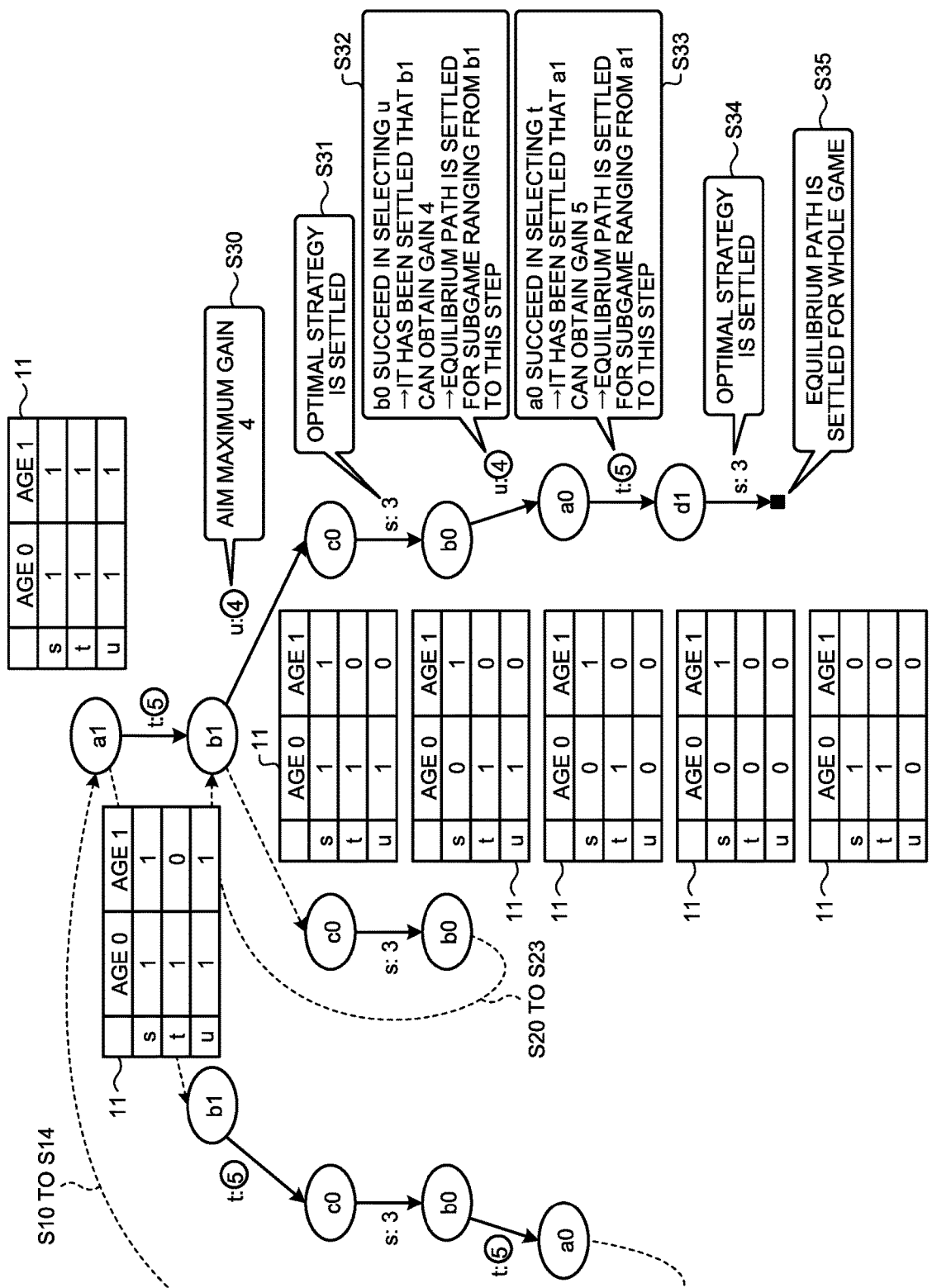
FIG. 10 is an explanatory drawing illustrating the specific example of matching processing.

FIG. 8 to FIG. 10 are explanatory drawings illustrating a specific example of the matching processing. In the application target information 11 corresponding to the steps (S10 to S14, S20 to S23, and S30 to S35) in FIG. 8 to FIG. 10, the number of acceptable children is reduced, by the player's selecting the class of age 0 or the class of age 1 in the day nurseries (s, t, u).

As illustrated in FIG. 8, the matching processor 30 selects a strategy having possibility that the player produces the maximum gain for the player oneself (S10 to S13), based on the gain tables 15A to 15C, in order (the order of a1, b1, c0, b0, a0, and d1) from the player corresponding to the applicant with the highest rank of priority.

Specifically, in the move of the player a1, the maximum gain 6 (selection of s) is aimed (S10), with expectation that a strategy satisfying the coupling request is selected in the move of a0 having a sibling relation with a1. Thereafter, in the move of the player b1, the maximum gain 5 (selection of t) is aimed (S11), with expectation that a strategy satisfying the coupling request is selected in the move of b0 having a sibling relation with b1.

Thereafter, in the move of the player c0, the optimal strategy (selection of s) is settled on the spot (S12), because the player c0 has no sibling relation. Thereafter, in the move of the player b0, a strategy (selection of t), as b1 has expected, can be selected. Accordingly, it is settled that the player b1 can obtain the gain "5". In addition, an equilibrium path is settled for the subgame ranging from b1 to this step (S13).

Thereafter, in the move of a0, no strategy (selection of s) according to the expectation of the player a1 can be selected. In this case, it is settled that the player a1 fails to obtain the gain "6". Accordingly, the option determination unit 40 removes the strategy (selection of s) to obtain the gain "6" from the strategies of the player a1, and backtracks to the move of the player a1 (S14).

As illustrated in FIG. 9, the matching processor 30 selects a strategy with possibility that the player produces the maximum gain for the player oneself, from the move of the player a1 after backtrack (S20 to S22). However, in the move of the player a1, the strategy (selection of s) to obtain the gain "6" has been removed.

Specifically, in the move of the player a1, the maximum gain 5 (selection of t) is aimed (S20) with expectation that a strategy satisfying the coupling request is selected in the move of the player a0 having a sibling relation with a1. Thereafter, in the move of the player b1, the maximum gain 6 (selection of s) is aimed (S21) with expectation that a strategy satisfying the coupling request is selected in the move of the player b0 having a sibling relation with b1.

Thereafter, in the move of the player c0, because the player c0 has no sibling relation, the optimal strategy (selection of s) is settled on the spot (S22).

Thereafter, in the move of the player b0, no strategy (selection of s) according to the expectation of b1 can be selected. In this case, it is settled that the player b1 fails to obtain the gain "6". Accordingly, the option determination unit 40 removes the strategy (selection of s) to obtain the gain "6" from the strategies of the player b1, and backtracks to the move of the player b1 (S23).

As illustrated in FIG. 10, the matching processor 30 selects a strategy with possibility that the player produces the maximum gain for the player oneself, from the move of the player b1 after backtrack (S30 to S35). However, in the move of the player b1, the strategy (selection of s) to obtain the gain "6" has been removed.

Specifically, in the move of the player b1, the maximum gain 4 (selection of u) is aimed (S30) with expectation that a strategy satisfying the coupling request is selected in the move of the player b0 having a sibling relation with b1. Thereafter, in the move of the player c0, the optimal strategy (selection of s) is settled (S31), because the player c0 has no sibling relation. In the move of the player b0, a strategy (selection of u) as b1 has expected can be selected. Accordingly, it is settled that the player b1 can obtain the gain "4". In addition, an equilibrium path is settled for the subgame ranging from b1 to this step (S32).

Thereafter, in the move of a0, a strategy (selection of t) as the player a1 has expected can be selected. Accordingly, it is settled that the player a1 can obtain the gain "5". In addition, an equilibrium path is settled for the subgame ranging from a1 to this step (S33).

Thereafter, in the move of the player d1, because the player d1 has no sibling relation, the optimal strategy (selection of s) is settled on the spot (S34). Because the player d1 is the last player, an equilibrium path for the whole game is settled (S35).

The option determination unit 40 may perform look-ahead processing to look ahead of the action of the player whose optimal strategy is obvious, and perform pruning of options in the game tree 16, based on the look-ahead action result of the player. The look-ahead processing may be performed prior to search for the equilibrium path in the matching processor 30, or may be performed during search for the equilibrium path.

For example, because the applicants other than the coupling-requesting applicants simply demand their gains, their optimal strategies are obvious. Accordingly, the option determination unit 40 executes the moves of the players corresponding to the applicants other than the coupling-requesting applicants before the moves of the players corresponding to the coupling-requesting applicants. In addition, the option determination unit 40 removes the strategies that the coupling-requesting applicants are not capable of selecting, as a result of the strategies of the players corresponding to the applicants other than the coupling-requesting applicants.

Figure 11:
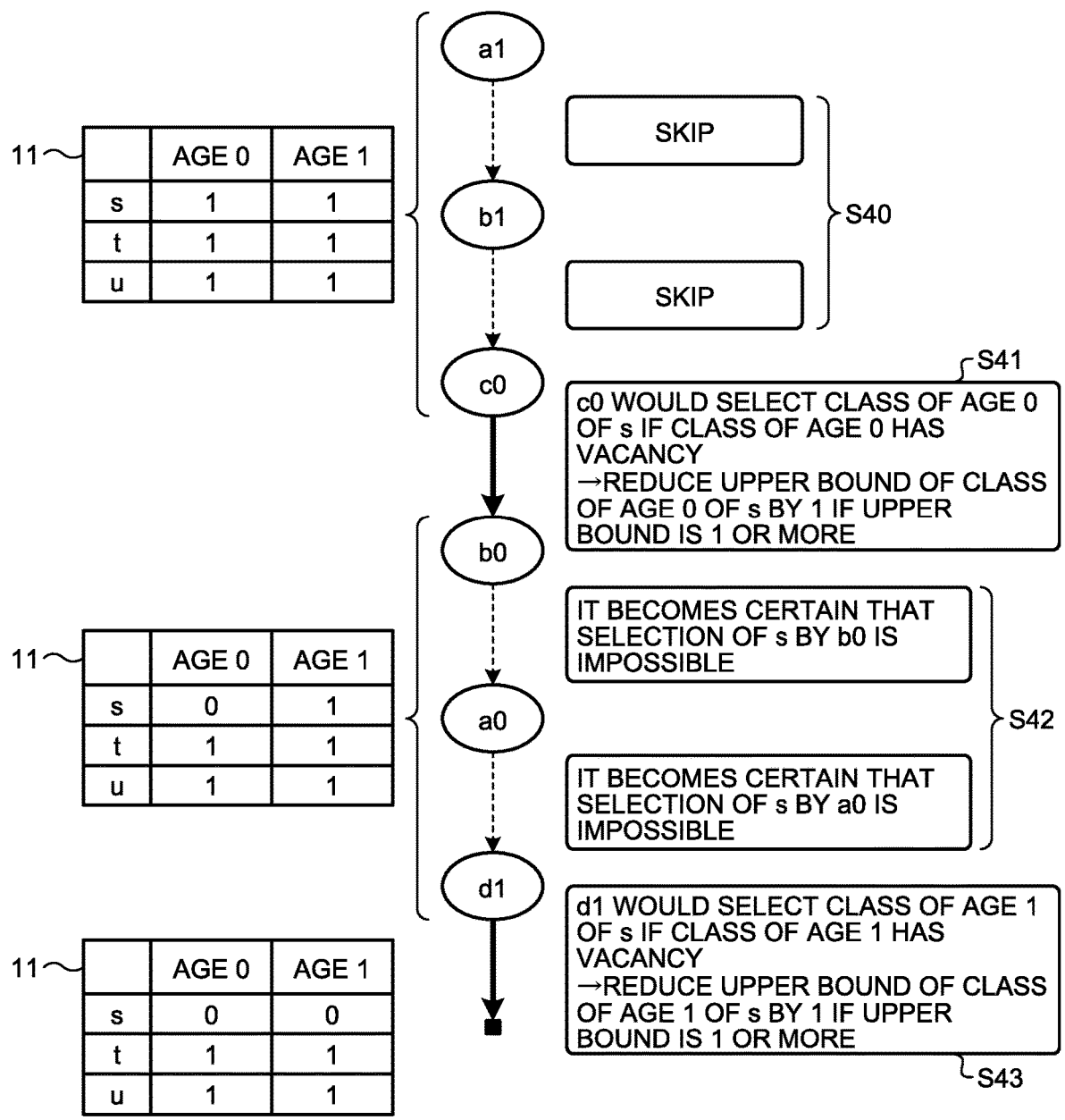
FIG. 11 is an explanatory drawing illustrating an example of look-ahead processing.
Figure 12:
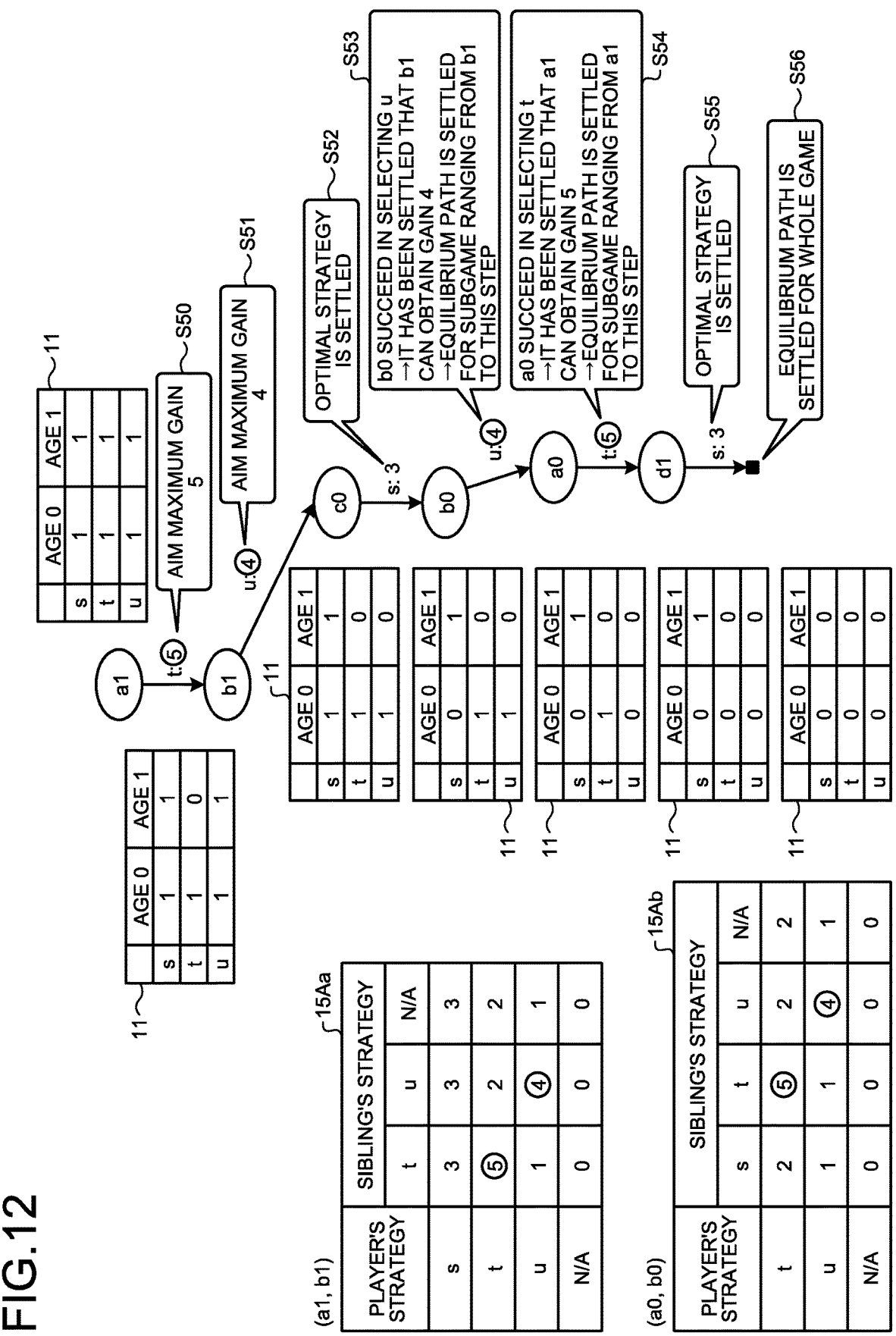
FIG. 12 is an explanatory drawing illustrating a specific example of matching processing after look-ahead processing.

FIG. 11 is an explanatory drawing illustrating an example of the look-ahead processing. FIG. 12 is an explanatory drawing illustrating a specific example of the matching processing after the look-ahead processing.

The example of the look-ahead processing and the matching processing after the look-ahead processing described hereinafter use the values of the application target information 11 and the applicant information 12 in FIG. 4, as a sample. The game tree and the subgame perfect equilibrium are based on FIG. 5 and FIG. 6. In the application target information 11 corresponding to the steps (S40 to S43 and S50 to S56) in FIG. 11 and FIG. 12, the number of acceptable children is reduced, by the player's selecting the class of age 0 or the class of age 1 in the day nurseries (s, t, u).

As illustrated in FIG. 11, the option determination unit 40 executes the moves of the players corresponding to the applicants (c0 and d1) other than the coupling-requesting applicants before the moves of the players (a1 and b1) corresponding to the coupling-requesting applicants (S40 to S43).

Specifically, the option determination unit 40 skips the moves of the players (a1 and b1) corresponding to the coupling-requesting applicants (S40). Thereafter, the option determination unit 40 executes the move of c0. In the move, because c0 would select the strategy (s) when the class of age 0 in the strategy (s) has a vacancy, the option determination unit 40 reduces the upper bound (the number of acceptable children) of the class of age 0 of the day nursery (s) by 1, when the upper bound is 1 or more (S41).

As a result of executing the move of c0, it becomes certain that selection of the strategy (s) is impossible in the moves of b0 and a0 (S42). Accordingly, the option determination unit 40 removes selection of the strategy (s) in the moves of b0 and a0, based on the result of execution of the move of c0.

Thereafter, the option determination unit 40 executes the move of d1. In the move, because the player d1 would select the strategy (s) when the class of age 1 in the strategy (s) has a vacancy, the option determination unit 40 reduces the upper bound (the number of acceptable children) of the class of age 1 of the day nursery (s) by 1, when the upper bound is 1 or more (S43).

As illustrated in FIG. 12, pruning of options in the game tree 16 is performed by the look-ahead processing described above. Specifically, selection of the strategy (s) in the moves of b0 and a0 is removed. The removal excludes the strategy s from the strategies of the sibling (b0 and a0) in the gain table 15Aa of a1 and b1. In addition, in the gain table 15Ab of b0 and a0, the strategy s is excluded from the player's strategies.

Accordingly, in the matching processing after the look-ahead processing, the processing is started in the state in which the strategy s is excluded from the strategies of b0 and a0. Specifically, the matching processor 30 selects a strategy with possibility that the player produces the maximum gain for the player oneself, based on the gain tables 15Aa, 15Ab, 15B, and 15C, in order (the order of a1, b1, c0, b0, a0, d1) from the player corresponding to the applicant with the highest rank of priority (S50 to S56).

In the move of the player a1, the maximum gain 5 (selection of t) is aimed (S50) with expectation that the strategy satisfying the coupling request is selected in the move of a0 having a sibling relation with a1. Thereafter, in the move of the player b1, the maximum gain 4 (selection of u) is aimed (S51) with expectation that the strategy satisfying the coupling request is selected in the move of b0 having a sibling relation with b1.

Thereafter, in the move of the player c0, the optimal strategy (selection of s) is settled on the spot (S52), because the player c0 has no sibling relation. Thereafter, in the move of the player b0, a strategy (selection of u) as b1 has expected can be selected. Accordingly, it is settled that the player b1 can obtain the gain "4". In addition, an equilibrium path is settled for the subgame ranging from b1 to this step (S53).

Thereafter, in the move of the player a0, the strategy (selection of t) as the player a1 has expected can be selected. Accordingly, it is settled that the player a1 can obtain the gain "5". In addition, an equilibrium path is settled for the subgame ranging from a1 to this step (S54).

Thereafter, in the move of the player d1, because the player d1 has no sibling relation, the optimal strategy (selection of s) is settled on the spot (S55). Because the player d1 is the last player, an equilibrium path for the whole game is settled (S56).

As described above, the look-ahead processing performed with the option determination unit 40 further reduces the number of paths to be searched to determine the subgame perfect equilibrium, and suppresses the calculation quantity.

With reference to FIG. 1 again, the output unit 50 outputs results of matching performed with the matching processor 30 and the option determination unit 40, that is, results of assignment of the applicants to the application targets, based on the result data 14 stored in the storage unit 10, by display on a display device, printing on a printer, output, or the like, as a file. For example, the output unit 50 displays, for each child, the day nurseries to which the children are assigned, based on the result data 14. This structure enables the user to assign the children to the day nurseries.

As described above, the matching apparatus 1 is an apparatus performing matching between a plurality of applicants provided with respective ranks of priority and a plurality of application targets, and includes the matching processor 30 and the option determination unit 40. The matching processor 30 determines subgame perfect equilibrium of a game in extensive form corresponding to matching, where the game in extensive form has a structure in which a plurality of independent players have respective gains corresponding to respective preferences of the respective applicants, and have the ranks of priority associated with the order of play, and each of the players recognizes the gains of all the players. The matching processor 30 performs matching based on results of the subgame perfect equilibrium, to obtain the result data 14. The matching processor 30 also sets the gain of the player corresponding to a coupling-requesting applicant having a coupling request requesting matching as a group with another specific applicant, in accordance with whether the coupling request is satisfied. The option determination unit 40 determines whether to prune options in a move of the player corresponding to the coupling-requesting applicant, with respect to options of a game tree 16 corresponding to a subgame of the game in extensive form in the matching processor 30, with reference to details of the coupling request of the coupling-requesting applicant.

As described above, the matching apparatus 1 determines subgame perfect equilibrium of the game in extensive form corresponding to the matching, and is capable of obtaining results (result data 14) assigning the applicants to the proper application targets, in accordance with preferences (preference lists and presence/absence of coupling) of the applicants. In addition, the matching apparatus 1 reduces the number of paths to be searched to determine the subgame perfect equilibrium, and determines the subgame perfect equilibrium with suppressed calculation quantity, by performing pruning of options of the game tree.

The following is a table illustrating results of experiments in the matching apparatus 1 of the present embodiments under the following conditions.

Setting Conditions

The number of day nurseries: 2 to 10

The number of classes divided by age in each of day nurseries: 6 classes

The number of acceptable children by each of day nurseries: 4

The number of children: 48 to 240

The rate of children having sibling relations: 0.4

The length of preference list: 2 to 10

The average of experimental results for 100 random problems is determined for each of the set parameters.

application target is the lower limit of the number of acceptable children (the number of vacancies) of the application target estimated in the move of each of the players. In other words, in the move of each of the players, the number of vacancies is equal to at least the lower bound of the application target.

In the second embodiment, the option determination unit 40 manages application target upper bound information indicating the upper bounds of the application targets, and application target lower bound information indicating the lower bounds of the application targets, with the memory or the like. The option determination unit 40 refers to the application target upper bound information and the application target lower bound information, in the look-ahead processing in the move of each of the players, to determine whether matching is established in the move, and determine presence/absence of the possibility of matching of the player.

Specifically, in the move of each of the players, when both the upper bound and the lower bound of the application

TABLE 1

| Number of day nurseries | Number of Children | Length of Preference list | Size of Game tree | Number of searched nodes | | Calculation time (seconds) | | Matching Quality | | |
|---|---|---|---|---|---|---|---|---|---|---|
| | | | | Without Look-ahead | With Look-ahead | Without Look-ahead | With Look-ahead | Problem 1 | Problem 2 | Problem 3 |
| 2 | 48 | 2 | $10^{14}$ | 161 | 596 | 0.00 | 0.00 | 0.00 | 0.00 | 0.00 |
| 4 | 96 | 4 | $10^{57}$ | 9388 | 3402 | 0.00 | 0.00 | 0.00 | 0.00 | 0.00 |
| 6 | 144 | 6 | $10^{112}$ | 3942095 | 15141 | 0.04 | 0.00 | 0.00 | 0.04 | 0.00 |
| 8 | 192 | 6 | $10^{173}$ | 223802889 | 39873 | 2.57 | 0.00 | 0.00 | 0.04 | 0.04 |
| 10 | 240 | 10 | $10^{240}$ | 6129594409 | 479988 | 71.85 | 0.01 | 0.00 | 0.06 | 0.05 |

As illustrated in the table of the experimental results, the matching quality according to the present embodiment enables acquisition of stable matching results suppressing occurrence of Problems 2 and 3 as much as possible, without causing Problem 1 described above. In addition, the matching quality prevents long calculation time in the case where the size of the game tree is large. In the case of performing look-ahead processing, the calculation time is suppressed to shorter time than that in the case of performing no look-ahead processing, even when the size of the game tree is large.

Second Embodiment

In the embodiment (first embodiment) described above, whether to prune the options is determined using the upper bound of the acceptable children of the application target (day nursery) in the move, in look-ahead processing to look ahead of the action of the player whose optimal strategy is obvious, for the move of each of the players. By contrast, the second embodiment has a structure in which whether to prune the options is determined using the lower bound of the application target, together with the upper bound of the application target, in the look-ahead processing of the move of each of the players.

The upper bound of the application target is the upper limit of the number of acceptable children (the number of vacancies) of the application target estimated in the move of each of the players. In other words, in the move of each of the players, the number of vacancies is at most the upper bound of the application target. The lower bound of the target are 0 and the number of vacancy of the application target is 0, the option determination unit 40 determines that no possibility of matching to the application target (day nursery) exists in the move. Specifically, the option determination unit 40 determines that there is no possibility of admission to the day nursery without vacancy in which both the upper bound and the lower bound are 0, in the move.

The option determination unit 40 also determines that the possibility of matching exists for the application target with the upper bound of 1 or more and the lower bound of 0, in the move of each of the players, because, although application to the target is not certain, the possibility of applying to the application target exists. The option determination unit 40 determines that application to the application target with the upper bound and the lower bound of 1 or more is certain, in the move of each of the players.

When it is certain to apply to the application target with the highest gain in the strategies (application targets), for which there is still a possibility of application according to the conditions, the option determination unit 40 settles that the application target is the optimal strategy, and determines that matching is established. The option determination unit 40 determines that matching is not established, when no application target serving as the optimal strategy exists, such as in the case in which a plurality of strategies remain, for which there is still a possibility of application according to the conditions.

For example, when the application target to which application is certain is one, the option determination unit 40 settles that application to the application target is the optimal strategy, and determines that matching is established. When a plurality of application targets to which application is certain exist, the option determination unit 40 determines that matching is not established, because, although application to one of the application targets is certain, the optimal strategy is not settled (however, there is a possibility of matching).

Thereafter, when it is determined that there is possibility that the player selects the application target (possibility of matching exists) in the moves of the players, the option determination unit 40 updates the number of the lower bound in the application target lower bound information for the application target with the possibility of matching. For example, the option determination unit 40 reduces the lower bound by the number (for example, by 1 corresponding to a move of a player) corresponding to the number of the moves, to update the number of the lower bound in the application target lower bound information.

In addition, when the option determination unit 40 determines that matching is established in each move of each of the players, the option determination unit 40 updates the number of the lower bounds in the application target lower bound information and the number of the upper bounds in the application target upper bound information for the application target for which matching is established. For example, the option determination unit 40 reduces each of the upper bound and the lower bound by the number (for example, by 1 corresponding to a move of a player) corresponding to the number of the moves, to update the number of the upper bounds in the application target upper bound information and the number of the lower bounds in the application target lower bound information.

Figure 13:
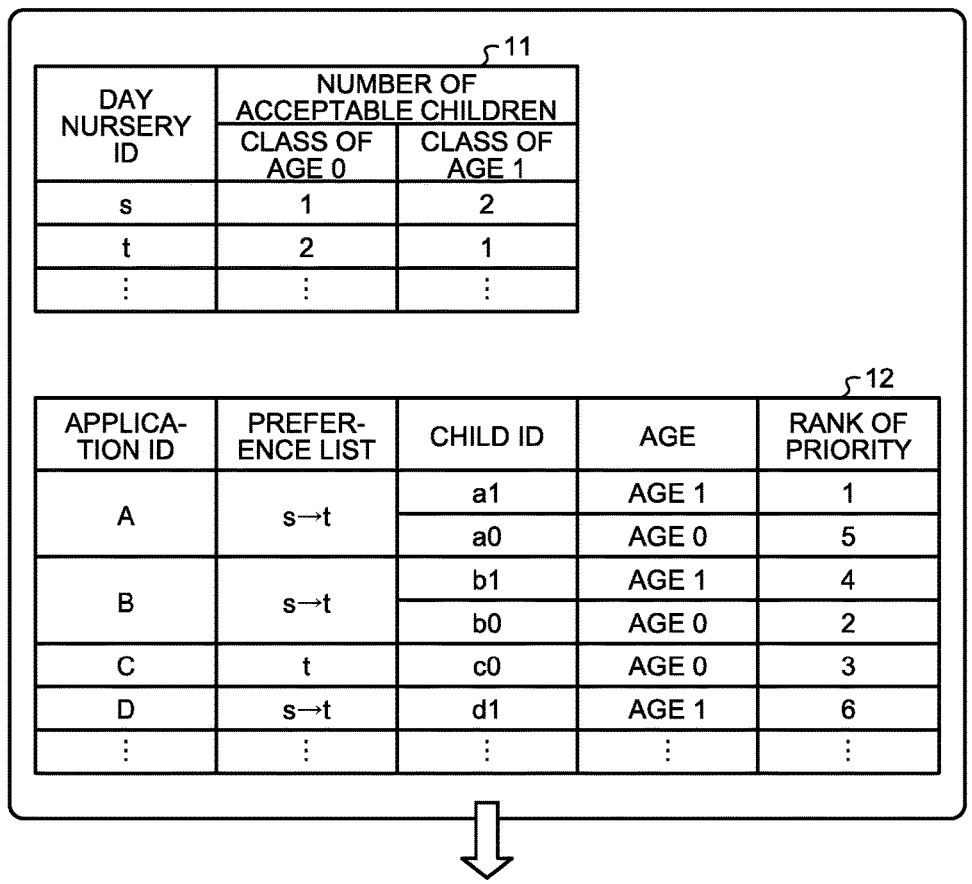
FIG. 13 is an explanatory drawing illustrating gain tables according to a second embodiment.

The following is an explanation of details of the processing according to the second embodiment, with reference to a specific example. FIG. 13 is an explanatory drawing illustrating gain tables according to the second embodiment.

As illustrated in FIG. 13, in the application target information 11, the numbers of acceptable children in the respective classes are set for each of the application targets (day nurseries) identified with day nursery IDs. The numbers of acceptable children set in the application target information 11 serve as initial values in the application target upper bound information and the application target lower bound information.

In addition, in the applicant information 12, a preference list, the age of the child, and the rank of priority are set for each of children (applicants) identified with the respective child IDs (a1 to d1). In the same manner as the first embodiment, the matching processor 30 sets gain tables 15D, 15E, and 15F according to strategies, for each of the players (children) corresponding to the applicants.

Thereafter, the option determination unit 40 determines whether matching is established in the move of the player, determines whether possibility of matching of the player exists, to perform look-ahead processing to look ahead of the action of the player whose optimal strategy is obvious, with reference to the application target upper bound information and the application target lower bound information. Thereafter, the option determination unit 40 prunes the options in the game tree 16, based on the result of the look-ahead action of the player. The look-ahead processing may be performed prior to search for the equilibrium path in the matching processor 30, or may be performed during search for the equilibrium path.

Figure 14:
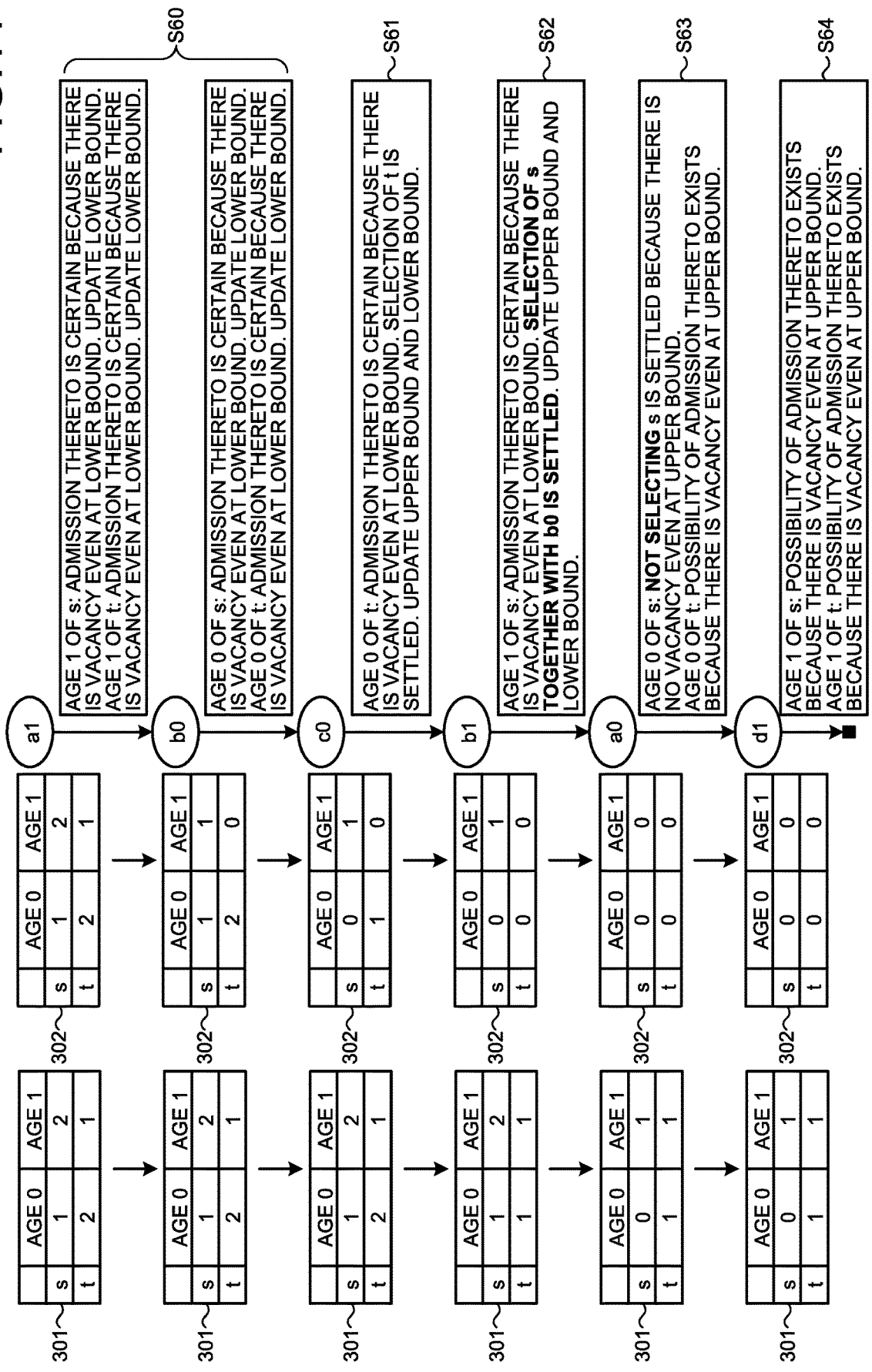
FIG. 14 is an explanatory drawing illustrating an example of look-ahead processing according to the second embodiment.
Figure 15:
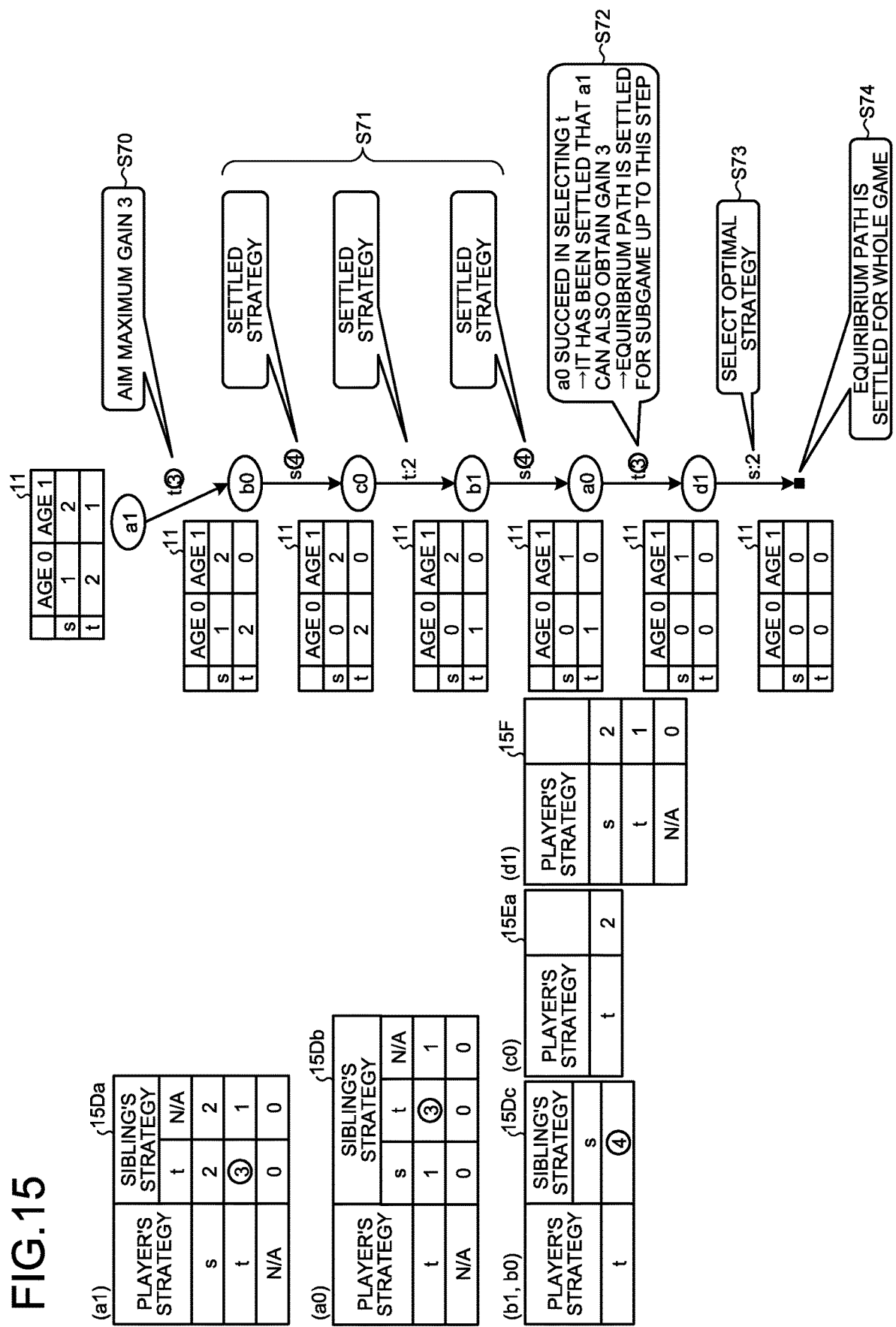
FIG. 15 is an explanatory drawing illustrating a specific example of matching processing according to the second embodiment.

FIG. 14 is an explanatory drawing illustrating an example of look-ahead processing according to the second embodiment. FIG. 15 is an explanatory drawing illustrating a specific example of matching processing according to the second embodiment. Specifically, FIG. 15 is a diagram illustrating matching processing performed after the look-ahead processing illustrated in FIG. 14.

As illustrated in FIG. 14, the option determination unit 40 determines whether matching is established, and whether the possibility of matching of the player exists, with reference to application target upper bound information 301 and application target lower bound information 302, in each of the moves in the play order (a1→b0→c0→b1→a0→d1) determined according to the rank of priority (S60 to S64). The initial values of the upper bounds and the lower bounds in the application target upper bound information 301 and the application target lower bound information 302 are the numbers of acceptable children set in the application target information 11.

Specifically, in the move of the child (a1) serving as the player, the option determination unit 40 determines that admission to the application target is certain, because there is a vacancy even at the lower bounds of the application targets (s: age 1, t: age 1) in the application target lower bound information 302. Because a plurality of application targets to which admission is certain exist, the option determination unit 40 determines that possibility of matching exists and matching is not established, for the application targets (s: age 1, t: age 1). Accordingly, the option determination unit 40 reduces the lower bound of the application target lower bound information 302 by 1 in each of the application targets (s: age 1, t: age 1), to update the application target lower bound information 302. A value of 0 is set as the minimum values of the upper bounds of the application target upper bound information 301 and the lower bounds of the application target lower bound information 302, and the values are not to be a value smaller than 0 in update.

In the same manner, in the move of the child (b0), the option determination unit 40 determines that admission to the application target is certain, because there is a vacancy even at the lower bounds of the application targets (s: age 0, t: age 0) in the application target lower bound information 302. Because a plurality of application targets to which admission is certain exist, the option determination unit 40 determines that possibility of matching exists and matching is not established, for the application targets (s: age 0, t: age 0). Accordingly, the option determination unit 40 reduces the lower bound of the application target lower bound information 302 by 1 in each of the application targets (s: age 0, t: age 0), to update the application target lower bound information 302 (S60).

Thereafter in the move of the child (c0), the option determination unit 40 determines that admission to the application target is certain, because there is a vacancy even at the lower bound of the application target (t: age 0) in the application target lower bound information 302. Because the application target to which admission is certain is one, the option determination unit 40 determines that selection of the application target (t: age 0) is settled in the move of the child (c0) and matching is established. Accordingly, the option determination unit 40 reduces the upper bound of the application target upper bound information 301 and the lower bound of the application target lower bound information 302 by 1 in the application target (t: age 0), to update the application target upper bound information 301 and the application target lower bound information 302 (S61).

Thereafter, in the move of the child (b1), the option determination unit 40 determines that admission to the application target is certain, because there is a vacancy even at the lower bound of the application target (s: age 1) in the application target lower bound information 302. Because the application target to which admission is certain is one, the option determination unit 40 determines that selection of the application target (s: age 1) is settled in the move of the child (b1) and matching is established. In addition, selection of the application target (s: age 0) in the application targets (s: age 0, t: age 0) is settled for the child (b0). Accordingly, the option determination unit 40 reduces the upper bound of the application target upper bound information 301 and the lower bound of the application target lower bound information 302 by 1 in each of the application targets (s: age 0, s: age 1), to update the application target upper bound information 301 and the application target lower bound information 302 (S62).

Thereafter, in the move of the child (a0), the option determination unit 40 settles that the application target (s: age 0) is not selected, because there is no vacancy even at the upper bound of the application target (s: age 0) in the application target upper bound information 301. Because the application target (t: age 0) has a vacancy, the option determination unit 40 determines that possibility of matching exists for the application target (t: age 0) (S63). Because the lower bound of the application target lower bound information 302 in the application target (t: age 0) has been reduced to 0, the option determination unit 40 maintains the value of the lower bound of the application target lower bound information 302.

Thereafter, in the move of the child (d1), the option determination unit 40 determines that possibility of matching exists for each of the application targets (s: age 1, t: age 1), because there is a vacancy at the upper bounds of the application targets (s: age 1, t: age 1) in the application target upper bound information 301 (S64). Because the lower bound of the application target lower bound information 302 in each of the application targets (s: age 1, t: age 1) has been reduced to 0, the option determination unit 40 maintains the value of the lower bound of the application target lower bound information 302, as it is.

As illustrated in FIG. 15, by the look-ahead processing described above, the options are pruned, based on the application targets settled in the moves of the players. Specifically, selection of the strategy (s) in the move of a0 is removed. In addition, selection of the strategy (t) is removed in the moves of b1 and b0. By removal of the options, in the gain table 15Da of a1, strategy s is excluded from the strategies of the sibling (a0). In addition, in the gain table 15Db of a0, the strategy s is excluded from the strategies of the player a0 oneself. Besides, in the gain table 15Dc of b1 and b0, the strategy t is excluded from the strategies of the players b1 and b0 themselves.

Accordingly, in the matching processing after the look-ahead processing, the processing is started in the state where the strategy s is excluded from the strategies of a0, and the strategy t is excluded from the strategies of b1 and b0. Specifically, the matching processor 30 selects the strategy with possibility that the player produces the maximum gain for the player oneself, based on the gain tables 15Da, 15Db, 15Dc, 15Ea, and 15F, in order (the order of a1→b0→c0→b1→a0→d1) from the player corresponding to the applicant with the highest rank of priority (S70 to S74).

For example, in the move of the player a1, the maximum gain 3 (selection of t) is aimed (S70), in expectation of selection of the strategy satisfying the coupling request in the move of a0 having a sibling relation. Thereafter, in the moves of the players b0, c0, and b1, the settled strategies are selected (S71).

Thereafter, in the move of the player a0, the strategy (selection of t) as the player a0 has expected can be selected. Accordingly, it is settled that the player a1 can obtain the gain "3". In addition, an equilibrium path is settled for the subgame ranging from a0 to this step (S72).

Thereafter, in the move of the player d1, the optimal strategy (selection of s) is settled on the spot (S73), because the player d1 has no sibling relation. Because d1 is the last player, an equilibrium path for the whole game is settled (S74).

As described above, the option determination unit 40 determines whether matching is established in the move of the player, and whether possibility of matching of the player exists, to prune the options, with reference to the application target upper bound information 301 and the application target lower bound information 302. This structure further reduces the number of paths to be searched to determine the subgame perfect equilibrium. In addition, reduction in the number of paths to be searched suppresses increase in calculation quantity.

The following is an explanation that the look-ahead processing according to the second embodiment reduces the number of paths to be searched to determine the subgame perfect equilibrium, in comparison with the look-ahead processing (comparative example) in the first embodiment.

Figure 16:
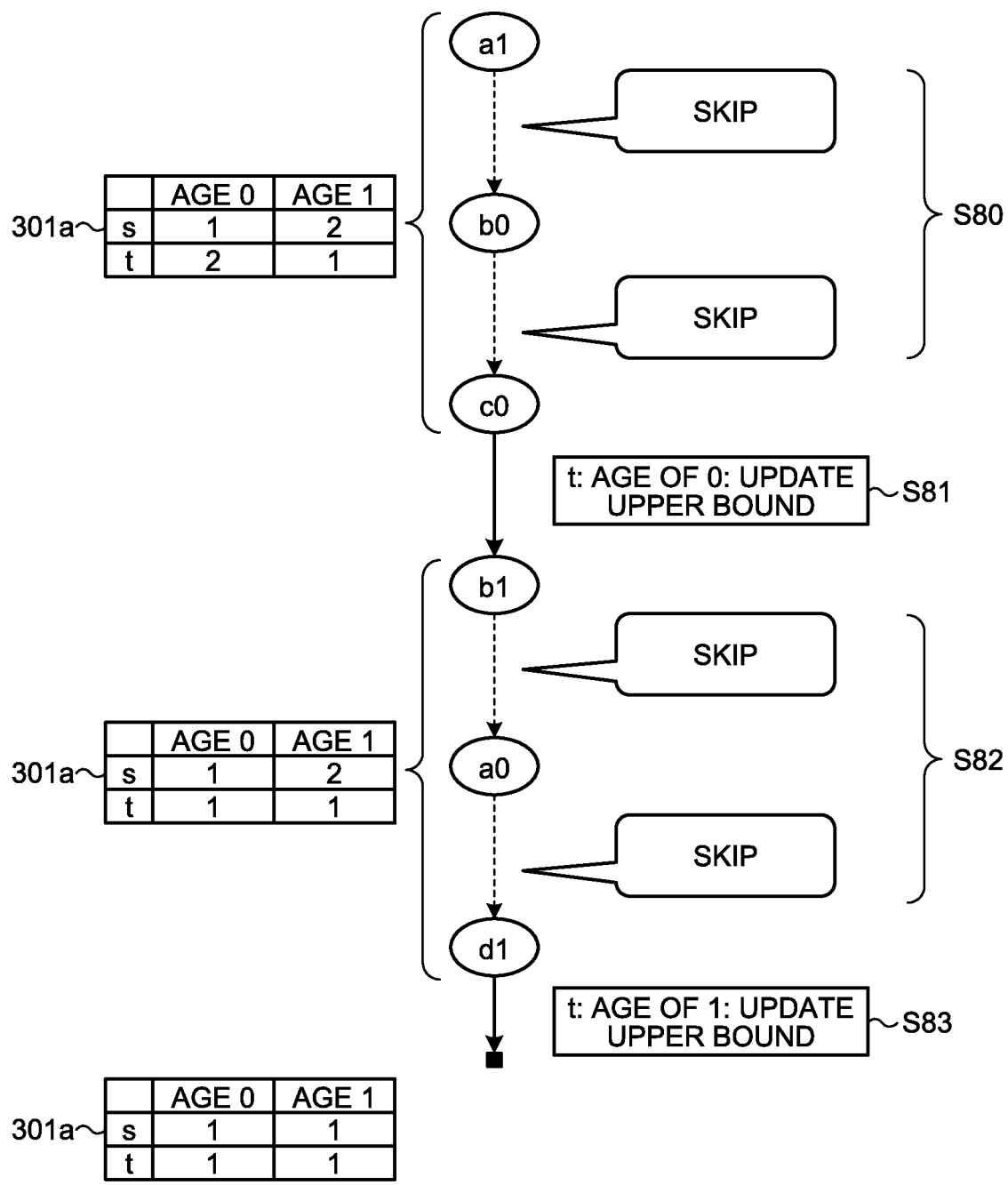
FIG. 16 is an explanatory drawing illustrating a comparative example of look-ahead processing.
Figure 17:
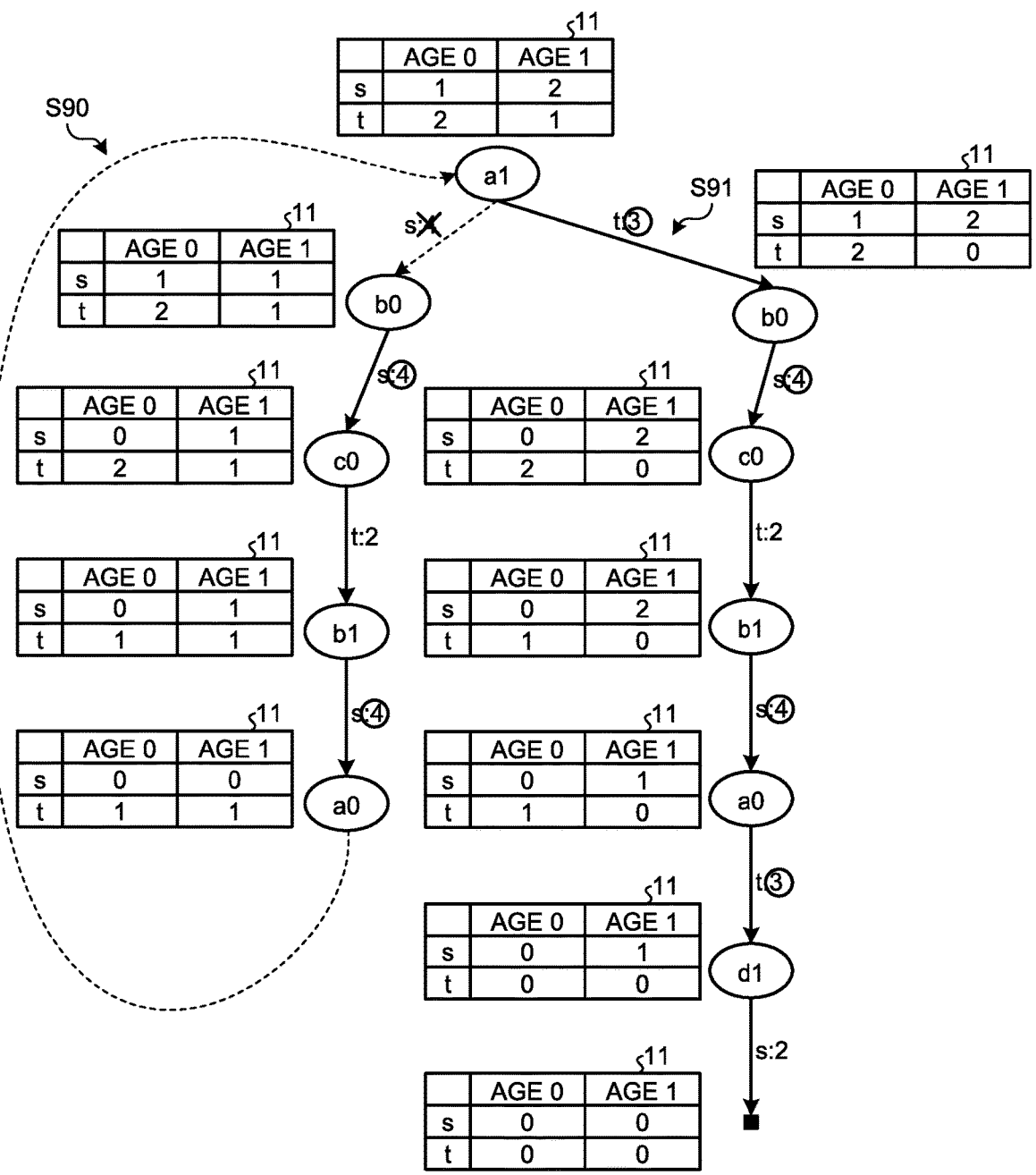
FIG. 17 is an explanatory drawing illustrating a comparative example of matching processing.

FIG. 16 is an explanatory drawing illustrating a comparative example of the look-ahead processing. FIG. 17 is an explanatory drawing illustrating a comparative example of the matching processing. Specifically, FIG. 17 is a diagram illustrating matching processing performed after the look-ahead processing illustrated in FIG. 16.

As illustrated in FIG. 16, in the look-ahead processing according to the first embodiment, the option determination unit 40 skips the moves of the players (a1, b0) corresponding to the coupling-requesting applicants (S80). Thereafter, the option determination unit 40 executes the move of the player c0. In the processing, c0 would select the strategy (t: age 0) if the strategy (t: age 0) has a vacancy. Accordingly, when the upper bound (the number of acceptable children) of the application target (t: age 0) in the application target upper bound information 301a is 1 or more, the option determination unit 40 reduces the upper bound by 1, to update the upper bound (S81).

Thereafter, the option determination unit 40 skips the moves of the players (b1, a0) corresponding to the coupling-requesting applicants (S82). Thereafter, the option determination unit 40 executes the move of the player d1. In the processing, d1 would select the strategy (s: age 1) if the strategy (s: age 1) has a vacancy. Accordingly, when the upper bound (the number of acceptable children) of the application target (s: age 1) in the application target upper bound information 301a is 1 or more, the option determination unit 40 reduces the upper bound by 1, to update the upper bound (S83).

As described above, in the look-ahead processing according to the first embodiment, there are no strategies to be removed because there are no strategies, selection of which by the coupling-requesting applicants has become impossible, and no strategies are settled. Accordingly, the matching processor 30 performs matching processing to select the strategy with possibility that the player produces the maximum gain for the player oneself, based on the gain tables 15D, 15E, and 15F illustrated in FIG. 13.

Specifically, as illustrated in FIG. 17, a path (path in which a1 selects the strategy (s)) to select the strategy with the maximum gain is searched (S90), in order from the move of the player a1. Because the path fails to achieve the expected gain, the option determination unit 40 backtracks, to remove the option (a1 selects the strategy (s)) failing to meet the expectation. Thereafter, a path in which a1 selects the strategy (s) is searched, and an equilibrium path for the whole game is settled (S91).

As is clear from comparison between the comparative example and the second embodiment (FIG. 15), the second embodiment reduces the number of paths to be searched, by the path on which backtrack is performed in the comparative example. Accordingly, the second embodiment further restrains increase in calculation quantity than the comparative example.

As described above, the matching apparatus 1 is an apparatus performing matching between a plurality of applicants provided with respective ranks of priority and a plurality of application targets, and includes the matching processor 30 and the option determination unit 40. The matching processor 30 determines subgame perfect equilibrium of a game in extensive form corresponding to matching, where the game in extensive form has a structure in which a plurality of independent players have respective gains corresponding to respective preferences of the respective applicants, and have the ranks of priority associated with the order of play, and each of the players recognizes the gains of all the players. The matching processor 30 performs matching based on results of the subgame perfect equilibrium, to obtain the result data 14. The matching processor 30 also sets the gain of the player corresponding to a coupling-requesting applicant having a coupling request requesting matching as a group with another specific applicant, in accordance with whether the coupling request is satisfied. The option determination unit 40 determines whether to prune options in a move of the player corresponding to the coupling-requesting applicant, with respect to options of a game tree 16 corresponding to a subgame of the game in extensive form in the matching processor 30, with reference to details of the coupling request of the coupling-requesting applicant. The option determination unit 40 also determines whether matching is established in the move, and whether possibility of matching of the player exists, with reference to the application target upper bound information 301 and the application target lower bound information 302 indicating an upper bound and a lower bound, respectively, of each of application targets for which matching has not been established, in the move of each of the players. In addition, when the option determination unit 40 determines that there is a possibility of matching, the option determination unit 40 updates the application target upper bound information 301. When the option determination unit 40 determines that matching is established, the option determination unit 40 updates the application target upper bound information 301 and the application target lower bound information 302.

As described above, the matching apparatus 1 determines whether matching is established using the application target upper bound information 301 and the application target lower bound information 302, in the move of each of the players, when subgame perfect equilibrium of the game in extensive form corresponding to matching is determined. This structure enables the matching apparatus 1 to reduce the number of paths to be searched in determining the subgame perfect equilibrium, and to determine the subgame perfect equilibrium with suppressed calculation quantity.

Each of the constituent elements of each of the illustrated devices is not always physically configured as illustrated. Specifically, specific forms of distribution and integration of the devices are not limited to those illustrated; however, the whole or part of them may be configured to be distributed or integrated functionally or physically in desired units, according to various loads and situations of use.

The whole or desired part of various processing functions executed with the matching apparatus 1 may be executed on a CPU (or a microcomputer, such as a MPU and Micro Controller Unit (MCU)). In addition, it is needless to say that the whole or desired part of the various processing functions may be executed on a program analyzed and executed on a CPU (or a microcomputer, such as a MPU and MCU), or hardware achieved by wired logic. The various processing functions executed with the matching apparatus 1 may be executed with a plurality of computers in cooperation, by cloud computing.

Figure 18:
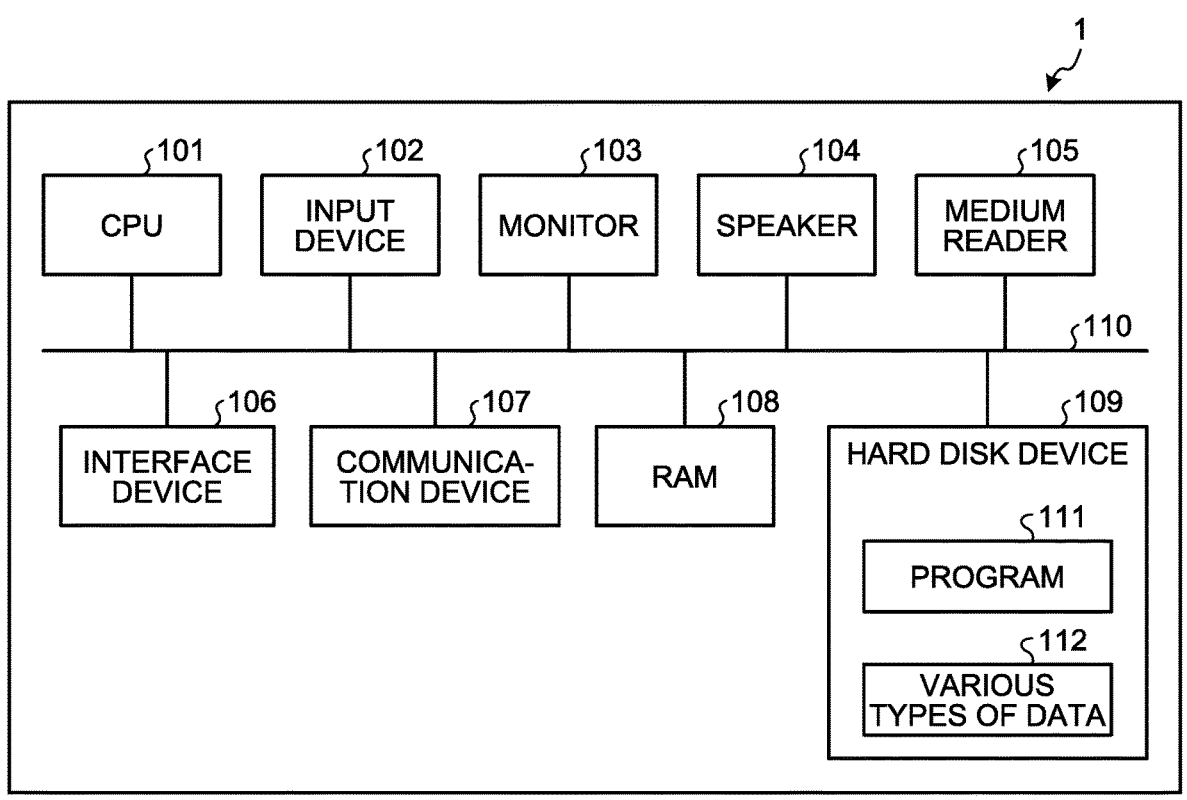
FIG. 18 is an explanatory drawing illustrating a hardware configuration example of the matching apparatus according to the embodiments.
Figure 19:
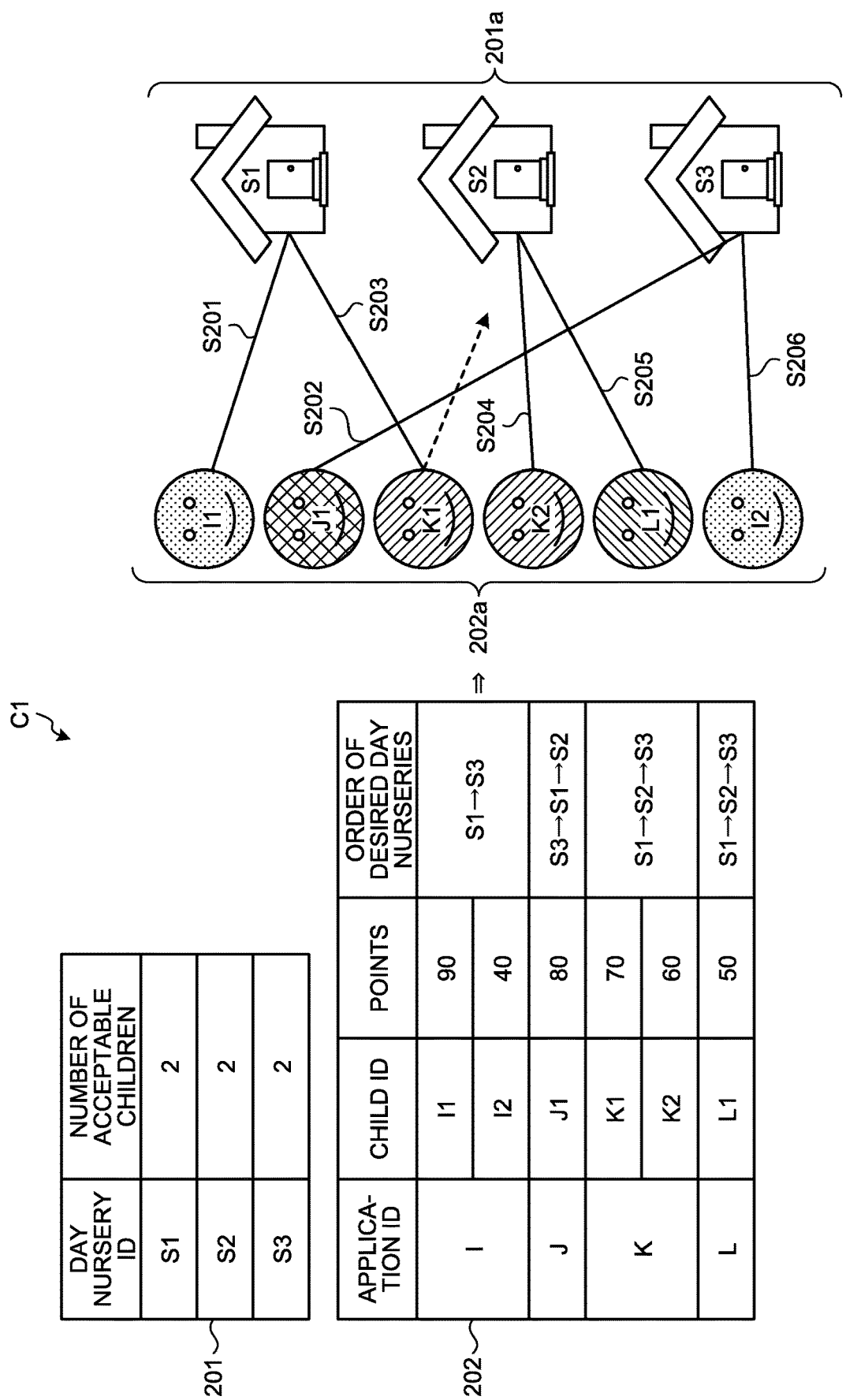
FIG. 19 is an explanatory drawing illustrating a first case.
Figure 20:
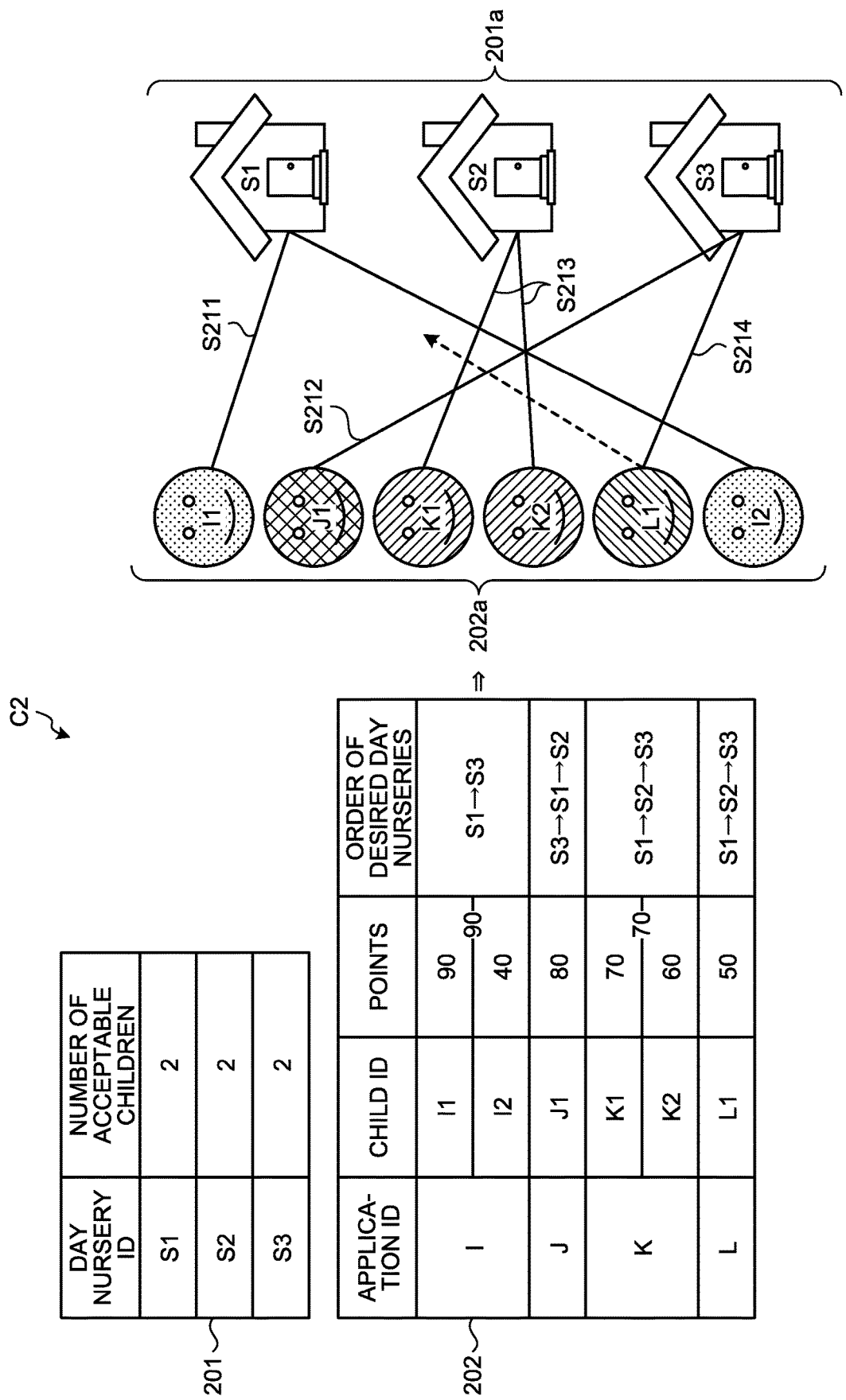
FIG. 20 is an explanatory drawing illustrating a second case.
Figure 21:
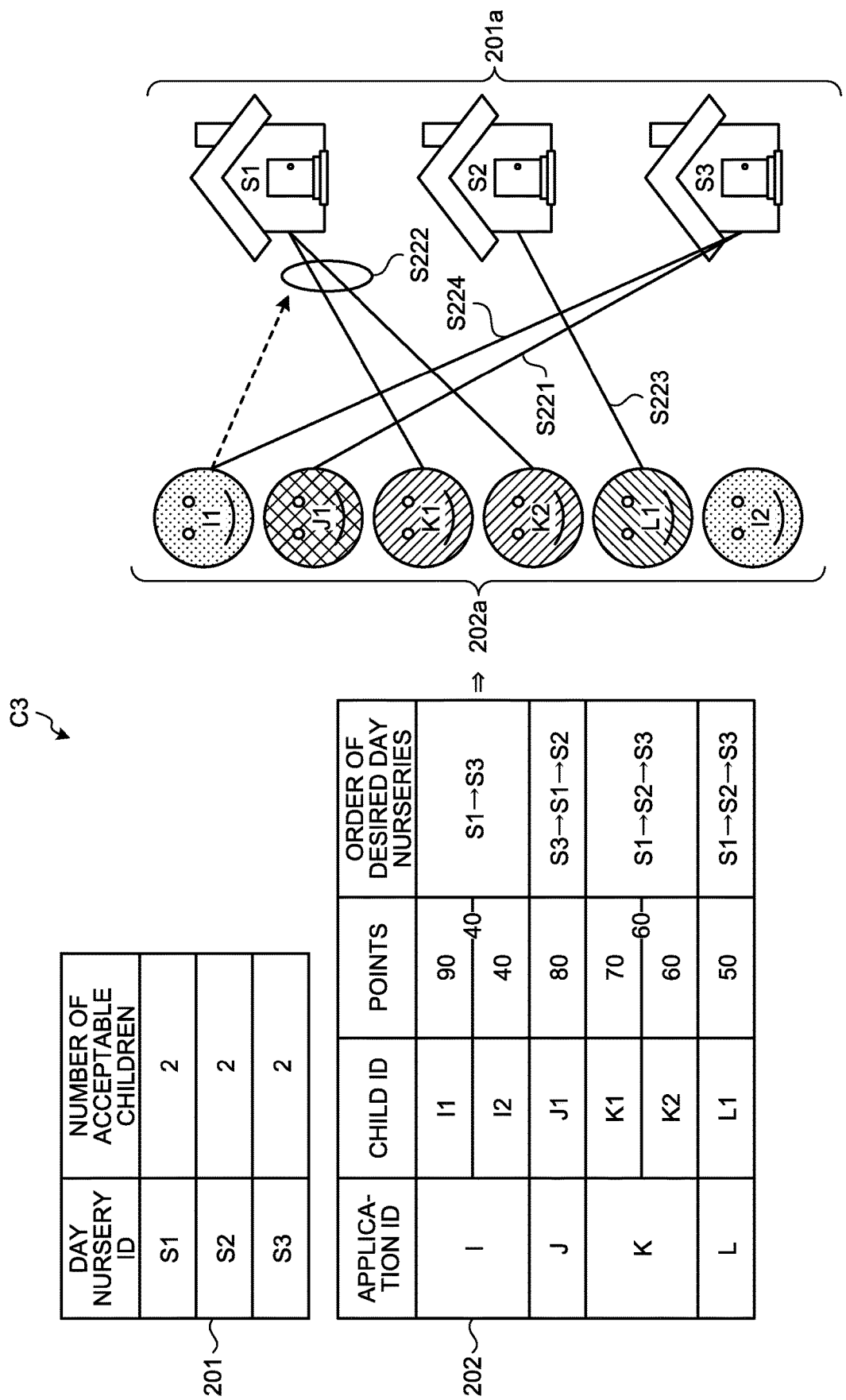
FIG. 21 is an explanatory drawing illustrating a third case.

The various types of processing explained in the embodiments described above can be achieved by executing a program prepared in advance, with a computer. The following is an explanation of an example of a computer (hardware) executing a program having the same functions as those of the embodiments described above. FIG. 18 is an explanatory drawing illustrating a hardware configuration example of the matching apparatus 1 according to the embodiments.

As illustrated in FIG. 18, the matching apparatus 1 includes a CPU 101 executing various types of arithmetic processing, an input device 102 receiving data inputs, a monitor 103, and a speaker 104. The matching apparatus 1 also includes a medium reader 105 reading a program or the like from a storage medium, an interface device 106 to connect with various devices, and a communication device 107 to communicate and connect with an external device in a wired or wireless manner. The matching apparatus 1 also includes a RAM 108 temporarily storing various types of information, and a hard disk device 109. The internal units (101 to 109) in the matching apparatus 1 are connected with a bus 110.

The hard disk device 109 stores therein a program 111 to execute various types of processing explained in the embodiments described above. The hard disk device 109 also stores therein various types of data 112 referred to by the program 111. The input device 102 receives, for example, an input of operating information from the operator of the matching apparatus 1. The monitor 103 displays, for example, various types of pictures to be operated by the operator. The interface device 106 is connected with, for example, a printer or the like. The communication device 107 is connected with a communication network, such as a local area network (LAN), to transmit and receive various types of information to and from the external device through the communication network.

The CPU 101 reads the program 111 stored in the hard disk device 109, loads the program onto the RAM 108, and execute the program, to perform various types of processing. The program 111 is not always stored in the hard disk device 109. For example, the matching apparatus 1 may read and execute the program 111 stored in a storage medium readable with the matching apparatus 1. The storage medium readable with the matching apparatus 1 is, for example, a portable recording medium, such as a CD-ROM, a DVD disk, a universal serial bus (USB) memory, a semiconductor memory, such as a flash memory, or a hard disk drive. As another example, the program may be stored in a device connected to a public line, the Internet, a LAN, or the like, and the matching apparatus 1 may read and execute the program therefrom.

An embodiment of the present invention enables assignment to proper application targets, with suppressed calculation quantity.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a matching program that causes a computer to execute a process comprising:
    first selecting for a first player a first move that selects an application target from among application targets and by which a first gain that is a highest gain therefor is obtained, wherein
        the first player is included in game players who participate in a game that matches the game players to the application targets wherein when a couple of players among the game players have a coupling request, the couple of players are matched to an application target, the game players each selecting a move in order of priorities respectively predetermined thereto, and
        a first gain for a player is set according to order of preferences thereof for the application targets wherein a second gain for the couple of players having the coupling request is set higher than the first gain for the player for who does not have the coupling request;
    second selecting for a second player a second move that selects an application target from among the application targets and by which a gain that is a highest gain therefor is obtained;
    determining whether the first gain is still obtained by the first player by the second move;
    canceling the first move when it is determined that the first gain is not obtained; and
    third selecting for the first player a move by which a second gain that is next to the first gain is obtained therefor.

2. The non-transitory computer-readable recording medium according to claim 1, wherein the first selecting includes, at a start of the game, fourth selecting for a player who does not have the coupling request a move that selects an application target from among the application targets and by which a gain that is a highest gain therefor is obtained.

3. The non-transitory computer-readable recording medium according to claim 1, wherein the couple of players having the coupling request have a sibling relation with each other.

4. The non-transitory computer-readable recording medium according to claim 1, wherein the game players are a plurality of children and the application targets are a plurality of day nurseries.

5. The non-transitory computer-readable recording medium according to claim 2, wherein
    the fourth selecting includes:
    determining whether it is possible to select the move based on upper bound information and lower bound information wherein the upper bound information indicates numbers of application targets whose matching with a player is not yet established and the lower bound information indicates numbers of application targets whose matching with a player is possible;
    updating the lower bound information, when it is determined that the matching is possible; and
    updating the upper bound information and the lower bound information, when it is determined that the matching is established.

6. The non-transitory computer-readable recording medium according to claim 5, wherein the determining includes reducing a number of an application target in the lower bound information, when it is determined that the matching is possible, and reducing a number of an application target in the upper bound information and a number of the application target in the lower bound information, when it is determined that the matching is established.

7. A matching method comprising:
    first selecting for a first player a first move that selects an application target from among application targets and by which a first gain that is a highest gain therefor is obtained, by a processor, wherein
    the first player is included in game players who participate in a game that matches the game players to the application targets wherein when a couple of players among the game players have a coupling request, the couple of players are matched to an application target, the game players each selecting a move in order of priorities respectively predetermined thereto, and
        a first gain for a player is set according to order of preferences thereof for the application targets wherein a second gain for the couple of players having the coupling request is set higher than the first gain for the player who does not have the coupling request;
    second selecting for a second player a second move that selects an application target from among the application targets and by which a gain that is a highest gain therefor is obtained, by the processor;
    determining whether the first gain is still obtained by the first player by the second move, by the processor;
    canceling the first move when it is determined that the first gain is not obtained, by the processor; and
    third selecting for the first player a move by which a second gain that is next to the first gain is obtained therefor, by the processor.

8. The matching method according to claim 7, wherein the first selecting includes, at a start of the game, fourth selecting for a player who does not have the coupling request a move that selects an application target from among the application targets and by which a gain that is a highest gain therefor is obtained, by the processor.

9. The matching method according to claim 7, wherein couple of players having the coupling request have a sibling relation with each other.

10. The matching method according to claim 7, wherein the game players are a plurality of children and the application targets are a plurality of day nurseries.

11. The matching method according to claim 8, wherein the fourth selecting includes:
    determining whether it is possible to select the move based on upper bound information and lower bound information wherein the upper bound information indicates numbers of application targets whose matching with a player is not yet established and the lower bound information indicates numbers of application targets whose matching with a player is possible, by the processor;

updating the lower bound information, when it is determined that the matching is possible, by the processor; and updating the upper bound information and the lower bound information, when it is determined that the matching is established, by the processor.

12. The matching method according to claim 11, wherein the determining includes reducing a number of an application target in the lower bound information, when it is determined that the matching is possible, and reducing a number of an application target in the upper bound information and a number of the application target in the lower bound information, when it is determined that the matching is established, by the processor.

13. A matching apparatus comprising:

a processor configured to:

first select for a first player a first move that selects an application target from among application targets and by which a first gain that is a highest gain therefor is obtained, wherein the first player is included in game players who participate in a game that matches the game players to the application targets wherein when a couple of players among the game players have a coupling request, the couple of players are matched to an application target, the game players each selecting a move in order of priorities respectively predetermined thereto, and a first gain for a player is set according to order of preferences thereof for the application targets wherein a second gain for the couple of players having the coupling request is set higher than the first gain for the player who does not have the coupling request;

second select for a second player a second move that selects an application target from among the application targets and by which a gain that is a highest gain therefor is obtained;

determine whether the first gain is still obtained by the first player by the second move;

cancel the first move when it is determined that the first gain is not obtained; and third select for the first player a move by which a second gain that is next to the first gain is obtained therefor.

14. The matching apparatus according to claim 13, wherein the first select includes, at a start of the game, fourth selecting for a player who does not have the coupling request a move that selects an application target from among the application targets and by which a gain that is a highest gain therefor is obtained.

15. The matching apparatus according to claim 13, wherein the couple of players having the coupling request have a sibling relation with each other.

16. The matching apparatus according to claim 13, wherein the game players are a plurality of children and the application targets are a plurality of day nurseries.

17. The matching apparatus according to claim 14, wherein the fourth selecting includes:

determining whether it is possible to select the move based on upper bound information and lower bound information wherein the upper bound information indicates numbers of application targets whose matching with a player is not yet established and the lower bound information indicates numbers of application targets whose matching with a player is possible;

updating the lower bound information, when it is determined that the matching is possible; and updating the upper bound information and the lower bound information, when it is determined that the matching is established.

18. The matching apparatus according to claim 17, wherein the determining includes reducing a number of an the application target in the lower bound information, when it is determined that the matching is possible, and reducing a number of an application target in the upper bound information and a number of the application target in the lower bound information, when it is determined that the matching is established.

* * * * *